(12) United States Patent
Sugita

(10) Patent No.: US 8,533,375 B2
(45) Date of Patent: Sep. 10, 2013

(54) SIGNAL TRANSMISSION SYSTEM, INTERFACE DEVICE, AND SIGNAL TRANSMISSION METHOD FOR SUPERIMPOSING A DATA SIGNAL ON AN ELECTRIC POWER LINE

(75) Inventor: Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 862 days.

(21) Appl. No.: 12/603,716

(22) Filed: Oct. 22, 2009

(65) Prior Publication Data

US 2010/0128766 A1    May 27, 2010

(30) Foreign Application Priority Data

Nov. 26, 2008   (JP) ................. 2008-301445

(51) Int. Cl.
*G06F 3/00* (2006.01)
*G06F 13/12* (2006.01)

(52) U.S. Cl.
USPC ............................................ 710/62; 710/61

(58) Field of Classification Search
None
See application file for complete search history.

(56) References Cited

U.S. PATENT DOCUMENTS

| 7,821,428 | B2 * | 10/2010 | Leung et al. ................ 341/101 |
| 8,014,675 | B2 * | 9/2011 | Sarashina et al. ............... 398/72 |
| 2002/0080010 | A1 * | 6/2002 | Zhang ..................... 340/310.06 |
| 2005/0162338 | A1 * | 7/2005 | Ikeda et al. .................... 345/2.1 |

FOREIGN PATENT DOCUMENTS

| JP | 61-294940 | 12/1986 |
| JP | 1-209844 | 8/1989 |
| JP | 3-109843 | 5/1991 |
| JP | 7-264250 | 10/1995 |
| JP | 2001-265710 | 9/2001 |

* cited by examiner

*Primary Examiner* — Idriss N Alrobaye
*Assistant Examiner* — Richard B Franklin
(74) *Attorney, Agent, or Firm* — Oblon, Spivak, McClelland, Maier & Neustadt, L.L.P.

(57) ABSTRACT

There is provided a signal transmission system including an information processing device and an interface device. The information processing device codes transmitted data into a code that does not include a direct-current component, and the information processing device transmits the code while superimposing the code on a direct-current power. A polarity of the code is inverted every half a period of a clock. The interface device detects a polarity inversion period of a signal received from the information processing device, and the interface device reproduces the clock based on the detection result.

7 Claims, 19 Drawing Sheets

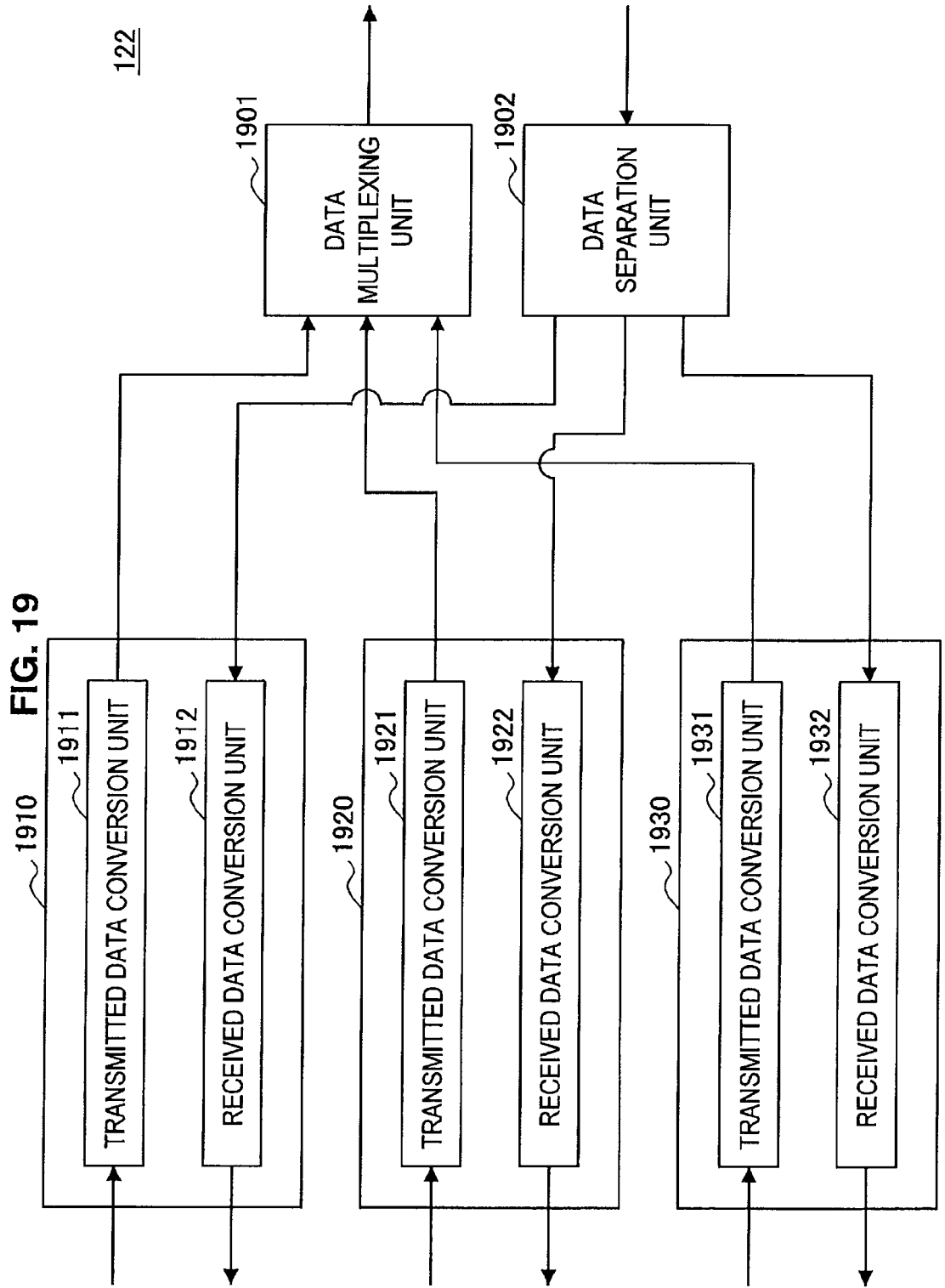

SIGNAL TRANSMISSION SYSTEM, INTERFACE DEVICE, AND SIGNAL TRANSMISSION METHOD FOR SUPERIMPOSING A DATA SIGNAL ON AN ELECTRIC POWER LINE

BACKGROUND OF THE INVENTION

1. Field of the Invention

The present invention relates to a signal transmission system, an interface device, and a signal transmission method.

2. Description of the Related Art

Information processing devices such as a notebook personal computer (hereinafter referred to as notebook PC) is operated by application of DC power from a built-in battery or an AC adapter. In the notebook PC, an interface is eliminated or the number of interfaces is decreased for the purpose of miniaturization. In some such notebook PCs, an interface device on which an extension port is mounted is externally connected to extend the interface. Signal transmission is performed between the interface device and the notebook PC by a serial transmission system. In the case of the serial transmission system, data is transmitted after coded. At this point, for example, a Manchester coding system or an AMI (Alternate Mark Inversion) coding system is used as a coding system. For example, Japanese Patent Application Laid-Open (JP-A) No. 1991-109843 discloses a technique of transmitting the data by an AMI code that is of a representative example of a bipolar code. JP-A No. 1991-109843 also discloses a technique, in which a data clock is transmitted while expressed by an intermediate value of a signal level and the data clock is reproduced on the reception side based on the signal level.

SUMMARY OF THE INVENTION

However, unfortunately it is necessary for a user to connect the notebook PC to both the AC adapter and the interface device when the user goes back to an office or home. Depending on a type of the interface device, the number of wiring lines of a PC connector is increased to enlarge the connector or to increase cost. In the case of a docking station, the notebook PC can be used only by placing the notebook PC on the docking station, and therefore the inconvenience is eliminated unlike the interface device. However, the number of wiring lines is increased to increase the number of signal lines of the PC connector to enlarge the connector or to increase the cost. For example, frequently the enlarged size or the increased cost becomes troublesome when a device, which has functions of both the interface device and the AC adapter while the wiring line exists in each of various interfaces such as USB, LAN, and a display, is simply produced. USB stands for a Universal Serial Bus. LAN stands for a Local Area Network.

There is a need for user-friendly, low-cost signal transmission system, interface device, and signal transmission method, wherein a signal is transmitted between the interface device and the information processing device while superimposed on an electric power, thereby decreasing the number of data signal lines.

According to an embodiment of the present invention, there is provided a signal transmission system comprising an information processing device and an interface device, wherein the information processing device includes: a data coding unit that codes data into first transmitted data, the first transmitted data not including a direct-current component; a signal sending unit that superimposes a signal of the first transmitted data produced by the data coding unit on a direct current and sends the superimposed signal to the interface device through a predetermined signal line; and a signal separation unit that receives a signal of second transmitted data on which the direct current is superimposed through the predetermined signal line and separates the received signal into the signal of the second transmitted data and the direct current, and the interface device includes: a data input and output terminal that is used to supply and feed the data; a signal separation unit that receives the signal of the first transmitted data on which the direct current is superimposed through the predetermined signal line and separates the received signal into the signal of the first transmitted data and the direct current; a signal receiving unit that receives the signal of the first transmitted data; a clock reproducing unit that reproduces a clock from the signal of the first transmitted data received by the signal receiving unit; a data decoding unit that decodes the first transmitted data using the clock reproduced by the clock reproducing unit and supplies the decoded first transmitted data to the data input and output terminal; a data coding unit that codes the second transmitted data into a code shape that does not include a direct-current component using the clock reproduced by the clock reproducing unit, the second transmitted data being fed from the data input and output terminal; and a signal sending unit that superimposes the signal of the second transmitted data produced by the data coding unit on the direct current and sends the superimposed data through the predetermined signal line. The data coding unit of the information processing device may code the transmitted data into a code shape whose polarity is inverted every half a period of the clock. The clock reproducing unit may detect a polarity inversion period of the data signal, and the clock reproducing unit reproduces the clock based on the detection result. The information processing device further may include: an internal secondary battery that supplies the direct current; and a voltage sensing unit that senses a voltage of the direct current separated by the signal separation unit, wherein the signal sending unit stops a charge circuit that charges the internal secondary battery when the voltage sensed by the voltage sensing unit is equal to or lower than a predetermined value. The information processing device may be operated using the direct current when the direct current is supplied from the interface, the information processing device may be operated using the direct current supplied from the internal secondary battery when the direct current is not supplied from the interface, and the information processing device may superimpose the transmitted data on the direct current supplied from the secondary battery. The interface device may be operated using the direct current when the information processing device supplies the direct current.

According to another embodiment of the present invention, there is provided an interface device comprising: a data input and output terminal that is used to supply and feed the data; a signal separation unit that receives a signal of first transmitted data on which a direct current is superimposed through a predetermined signal line and separates the received signal into the signal of the first transmitted data and the direct current; a signal receiving unit that receives the signal of the first transmitted data through the predetermined signal line, the signal of the first transmitted data being coded in a code that does not include a direct-current component; a clock reproducing unit that reproduces a clock from the signal of the first transmitted data received by the signal receiving unit; a data decoding unit that decodes the first transmitted data using the clock reproduced by the clock reproducing unit and supplies the decoded first transmitted data to the data input and output terminal; a data coding unit that codes second transmitted data into a code shape that does not include the direct-current component using the clock reproduced by the clock reproducing unit, the second transmitted data being fed from the data input and output terminal; and a signal sending unit that superimposes the direct current on the signal of the second transmitted data produced by the data coding unit and sends the superimposed data through the predetermined signal line. The signal receiving unit may receive the signal of the first transmitted data through the predetermined signal line, the first transmitted data being coded into a code shape whose polarity is inverted every half a period of the clock. The clock reproducing unit may detect a polarity inversion period of the data signal, and the clock reproducing unit reproduces the clock based on the detection result.

According to another embodiment of the present invention, there is provided an information processing device comprising: a data coding unit that codes data into first transmitted data, the first transmitted data not including a direct-current component; a signal sending unit that superimposes a signal of the first transmitted data produced by the data coding unit on a direct current and sends the superimposed signal to the interface device through a predetermined signal line; and a signal separation unit that receives a signal of second transmitted data on which the direct current is superimposed through the predetermined signal line and separates the received signal into the signal of the second transmitted data and the direct current. The data coding unit may code the transmitted data into a code shape whose polarity is inverted every half a period of the clock. The interface device may further comprise: a current supply terminal to which an alternating current is supplied from an external power supply; and a conversion circuit that converts the alternating current supplied to the current supply terminal into the direct current, wherein the signal sending unit sends the signal of the second transmitted data while superimposing the signal of the second transmitted data on the direct current supplied from the conversion circuit. The interface device may further comprise a current supply terminal to which the direct current is supplied, wherein the signal sending unit sends the signal of the second transmitted data while superimposing the signal of the second transmitted data on the direct current supplied from the current supply terminal. The data coding unit may code the second transmitted data into a code shape that is selected a group consisting of at least an AMI (Alternate Mark Inversion) code, a CMI (Coded Mark Inversion) code, a partial response code, a Manchester code, and a bi-phase code including AM (Amplitude Modulation) modulation.

According to another embodiment of the present invention, there is provided an interface device comprising: a data input and output terminal that is used to supply and feed the data; a signal receiving unit that receives a superimposed signal through a predetermined signal line, a signal of first transmitted data and a direct current are superimposed in the superimposed signal, the signal of the first transmitted data being coded into a code that does not include a direct-current component; a signal separation unit that separates the superimposed signal received by the signal receiving unit into the signal of the first transmitted data and the direct current; a clock reproducing unit that reproduces a clock from the signal of the first transmitted data separated by the signal separation unit; a data decoding unit that decodes the first transmitted data using the clock reproduced by the clock reproducing unit and supplies the decoded first transmitted data to the data input and output terminal; a data coding unit that codes second transmitted data into a code shape that does not include the direct-current component using the clock reproduced by the clock reproducing unit, the second transmitted data being fed from the data input and output terminal; and a signal sending unit that superimposes the signal of the second transmitted data produced by the data coding unit on the direct current and sends the superimposed data through the predetermined signal line. The signal receiving unit may receive the signal of the first transmitted data through the predetermined signal line, the first transmitted data being coded into a code shape whose polarity is inverted every half a period of the clock. The clock reproducing unit may detect a polarity inversion period of the data signal, and the clock reproducing unit reproduces the clock based on the detection result.

According to another embodiment of the present invention, there is provided a signal transmission method, comprising the steps of: coding data into first transmitted data with an information processing device, the code not including a direct-current component; superimposing a signal of the first transmitted data produced by the data coding unit on a direct current with the information processing device and sending the superimposed signal to an interface device through a predetermined signal line with the information processing device; receiving a signal of second transmitted data on which the direct current is superimposed through the predetermined signal line with the information processing device and separating the received signal into the signal of the second transmitted data and the direct current with the information processing device; supplying and feeding the data through a data input and output terminal that is used to supply and feed the data with the interface device; receiving the signal of the first transmitted data on which the direct current is superimposed through the predetermined signal line with the interface device and separating the received signal into the signal of the first transmitted data and the direct current with the interface device; receiving the signal of the first transmitted data through the predetermined signal line with the interface device; reproducing a clock from the signal of the first transmitted data received in the signal receiving step with the interface device; decoding the first transmitted data with the interface device using the clock reproduced in the clock reproducing step and supplying the decoded first transmitted data to the data input and output terminal with the interface device; coding the second transmitted data into a code shape that does not include a direct-current component with the interface device using the clock reproduced in the clock reproducing step, the second transmitted data being fed from the data input and output terminal; and superimposing the signal of the second transmitted data produced in the data coding step on the direct current with the interface device and sending the superimposed data through the predetermined signal line with the interface device.

According to another embodiment of the present invention, there is provided a signal transmission method, comprising the steps of: supplying and feeding data through a data input and output terminal that is used to supply and feed the data; receiving a signal of first transmitted data on which a direct current is superimposed through a predetermined signal line and separating the received signal into the signal of the first transmitted data and the direct current; receiving the signal of the first transmitted data through the predetermined signal line, the signal of the first transmitted data being coded in a code that does not include a direct-current component; reproducing a clock from the signal of the first transmitted data received in the signal receiving step; decoding the first transmitted data using the clock reproduced in the clock reproducing step and supplying the decoded first transmitted data to the data input and output terminal; coding second transmitted data into a code shape that does not include the direct-current component using the clock reproduced in the clock reproducing step, the second transmitted data being fed from the data input and output terminal; and superimposing the direct current on the signal of the second transmitted data produced in the data coding step and sending the superimposed data through the predetermined signal line.

According to another embodiment of the present invention, there is provided a signal transmission method, comprising the steps of: supplying and feeding data through a data input and output terminal that is used to supply and feed the data; receiving a superimposed signal through a predetermined signal line, a signal of first transmitted data and a direct current are superimposed in the superimposed signal, the signal of the first transmitted data being coded into a code that does not include a direct-current component; separating the superimposed signal received in the signal receiving step into the signal of the first transmitted data and the direct current; reproducing a clock from the signal of the first transmitted data separated in the signal separation step; decoding the first transmitted data using the clock reproduced in the clock reproducing step and supplying the decoded first transmitted data to the data input and output terminal; coding second transmitted data into a code shape that does not include the direct-current component using the clock reproduced in the clock reproducing step, the second transmitted data being fed from the data input and output terminal; and superimposing the signal of the second transmitted data produced in the data coding step on the direct current and sending the superimposed data through the predetermined signal line.

As described above, in the embodiments of the invention, the a signal is transmitted between the interface device and the information processing device while superimposed on the electric power, the number of data signal lines between the interface device and the information processing device can dramatically be decreased to reduce the cost of the interface and the inconvenience to a user.

BRIEF DESCRIPTION OF THE DRAWINGS

FIG. 19 is an explanatory view illustrating a signal processing unit in the signal transmission system of the fourth embodiment.

DETAILED DESCRIPTION OF EMBODIMENT

Figure 1:
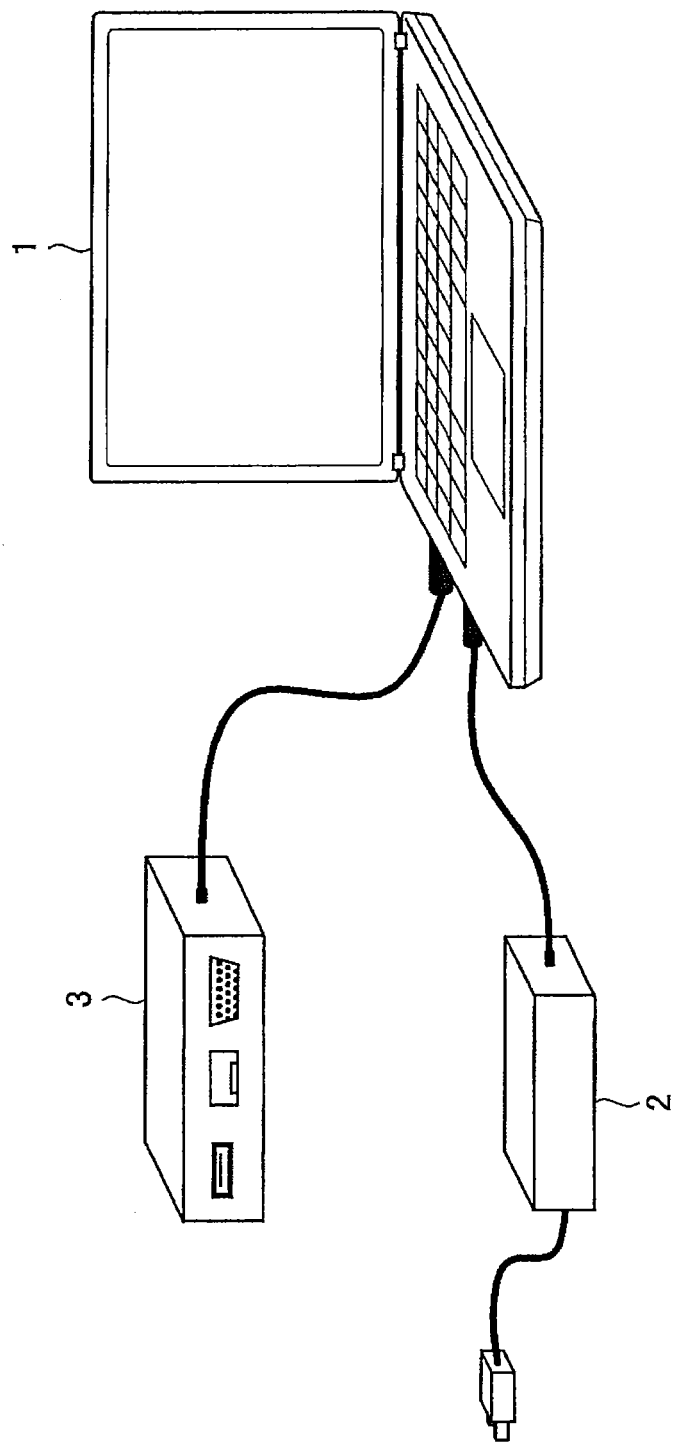
FIG. 1 is an explanatory view illustrating a signal transmission system in the past.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of the description will be made below. First a various modes of a signal transmission system will briefly be described with reference to FIGS. 1 to 4.

Then signal transmission systems according to embodiments of the invention will be described with reference to FIGS. 5 to 17. Finally technical thoughts of the embodiments are summarized, and the effect obtained from the technical thoughts will briefly be described.

(Description Article)

1. Organization of issue 1-1. System configuration of signal transmission system 10

1-2. System configuration of signal transmission system 30

1-3. Issues with signal transmission systems 10 and 30

2. Embodiments 2-1. First embodiment of the invention: system configuration of signal transmission system 100

2-2. Second embodiment of the invention: system configuration of signal transmission system 200

2-3. Third embodiment of the invention: system configuration of signal transmission system 300

2-4. Fourth embodiment of the invention: system configuration of signal transmission system 400

2-5. Coding system 2-6. Superposition circuit 2-7. Signal processing unit 2-8. Summary 1. Organization of Issue The issue to be solved technique by the embodiments of the invention will briefly be summarized prior to the detailed description of the technique of the embodiments.

1-1. System Configuration of Signal Transmission System 10

FIG. 1 is an explanatory view illustrating a signal transmission system 10. The signal transmission system 10 includes a notebook PC 1, an AC adapter 2, and an interface BOX 3. The notebook PC 1 is operated by application of a DC power from the AC adapter 2. In the notebook PC 1, an interface is eliminated or the number of interfaces is decreased for the purpose of miniaturization. Therefore, the interface can be extended by connecting the interface BOX 3.

Figure 2:
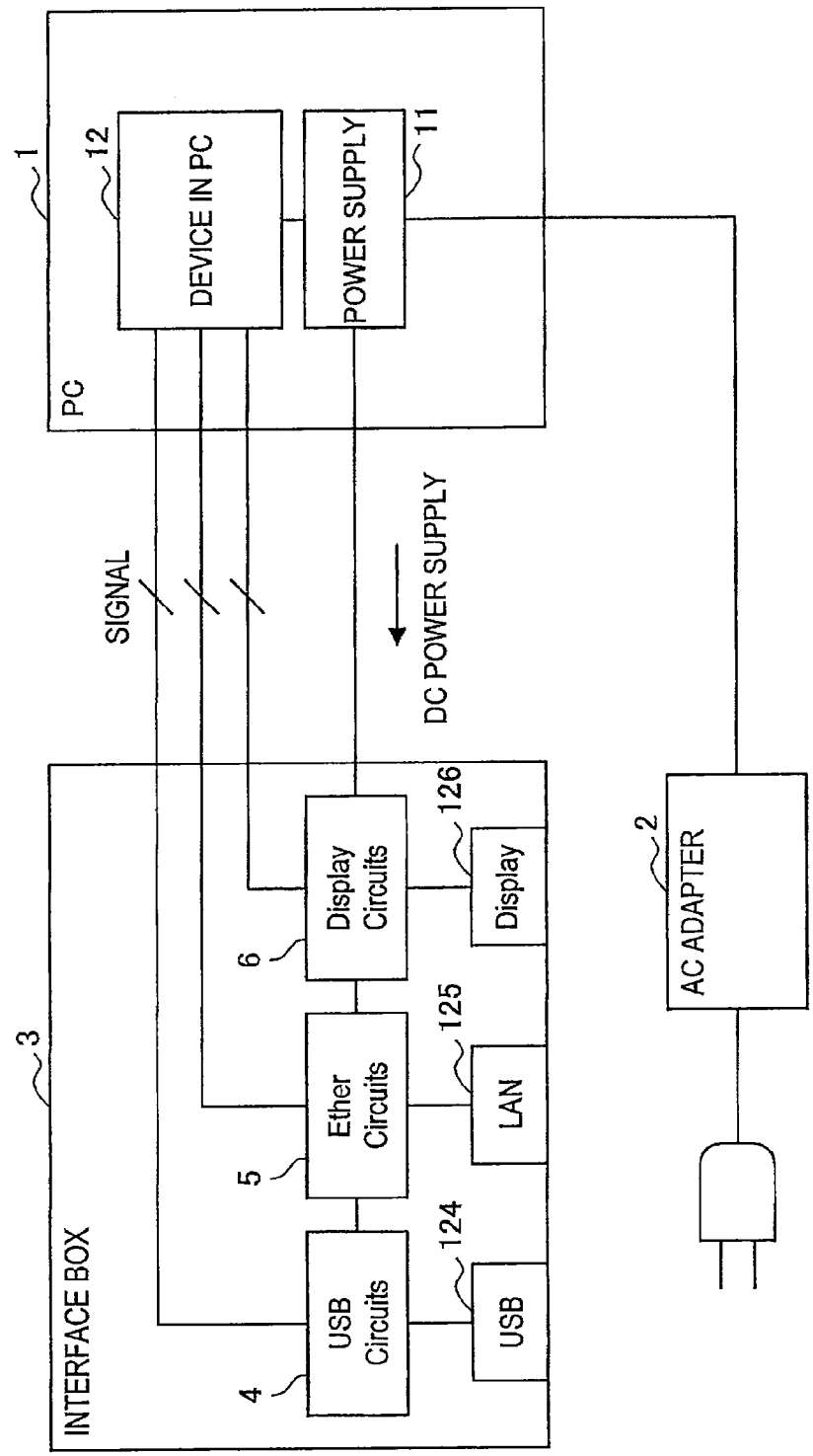
FIG. 2 is a functional configuration diagram illustrating the signal transmission system in the past.

FIG. 2 is a functional configuration diagram illustrating the signal transmission system 10 of FIG. 1. A power supply 11 supplies an electric power to a device 12 of the notebook PC 1. The power supply 11 also supplies the power to the interface BOX 3. The interface BOX 3 receives the DC power supplied from the notebook PC 1. A signal line for built-in interface is provided between the interface BOX 3 and the notebook PC 1. In order to provide terminals of USB 7, LAN 8, and a display 9 in the interface BOX 3, a USB circuit 4, an Ethernet (registered trademark) circuit 5, and a display circuit 6 are provided in the interface BOX 3. A signal line is provided between the notebook PC 1 and each of the USB circuit 4, Ethernet (registered trademark) circuit 5, and the display circuit 6.

1-2. System Configuration of Signal Transmission System 30

Figure 3:
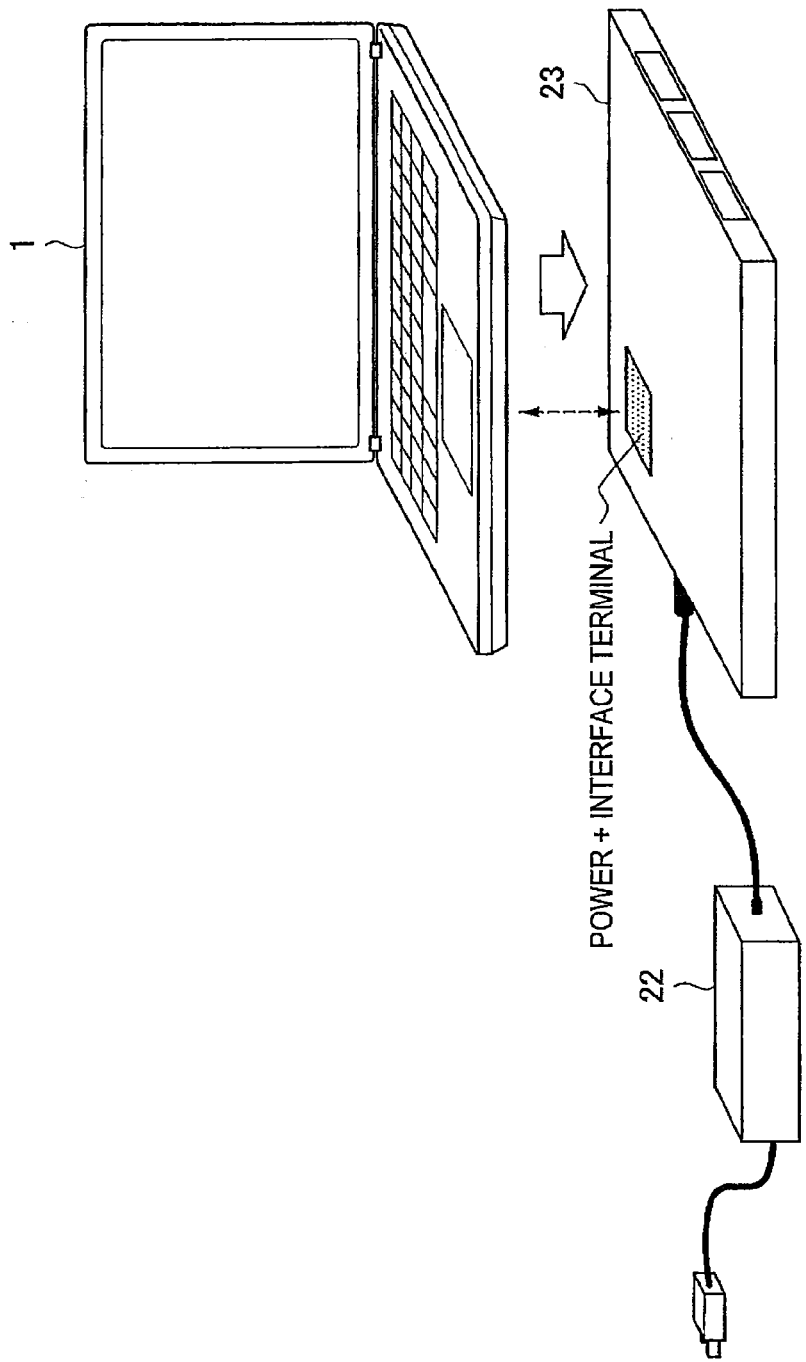
FIG. 3 is an explanatory view illustrating a signal transmission system in the past.

FIG. 3 is an explanatory view illustrating a signal transmission system 30. The signal transmission system 30 includes the notebook PC 1, an AC adapter 22, and a docking station 23. As illustrated in FIG. 3, a user can extend the interface by placing the notebook PC 1 on the docking station 23. In such cases, the AC adapter 22 is connected to the docking station 23. The notebook PC 1 receives an electric power supplied from the docking station 23. Plural interfaces are incorporated in the docking station 23 that can be connected to the notebook PC 1.

Figure 4:
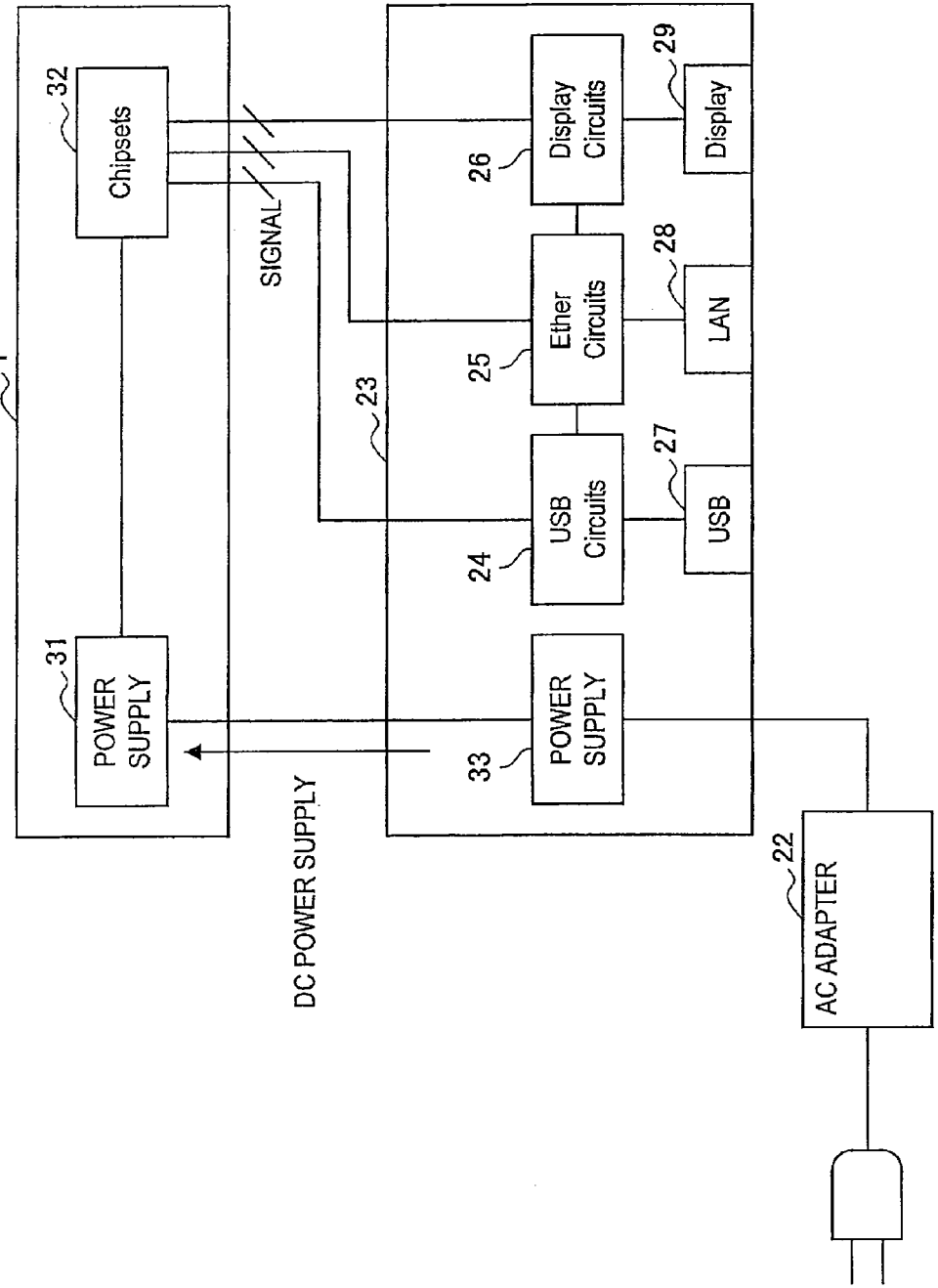
FIG. 4 is a functional configuration diagram illustrating the signal transmission system in the past.

FIG. 4 is a functional configuration diagram illustrating the signal transmission system of FIG. 3. The AC adapter 22 is connected to the docking station 23 to supply the DC power. A DC power supply 33 in the docking station 23 branches the fed DC power, one of the branched DC powers is supplied to the notebook PC 1, and the other is used an the power of each circuit in the docking station 23. Wiring lines are provided between the docking station 23 and the notebook PC 1 according to the built-in interface. In order to provide terminals of USB 27, LAN 28, and a display 29 in the docking station 23, it is necessary that a USB circuit 24, an Ethernet (registered trademark) circuit 25, and a display circuit 26 be incorporated in the docking station 23. It is also necessary that the signal line be provided between the notebook PC 1 and each of the USB circuit 24, Ethernet (registered trademark) circuit 25, and the display circuit 26.

1-3. Issues with Signal Transmission Systems 10 and 30

In the signal transmission system 10 and 30 of FIGS. 1 to 4, it is necessary that the notebook PC 1 be connected to the AC adapters 2 and 22 and the interface BOX 3 or the docking station 23. When the notebook PC 1 is used, it is inconvenient to connect the notebook PC 1 to both the AC adapter 2 and the interface BOX 3. On the other hand, even when the docking station 23 is used along with the notebook PC 1, although the inconvenience is eliminated unlike the interface BOX 3, the number of wiring lines is increased, and the number of signal lines of the PC connector is increased, which causes the enlarged or expensive connector. Therefore, in the later-mentioned embodiments, there are proposed techniques to solve the issues.

2. Embodiments

Embodiments of the invention will be described below. In the embodiments, a function of the interface BOX is incorporated in the AC adapter to eliminate such the inconvenience that the notebook PC is connected to both the AC adapter and the interface BOX in use.

2-1. First Embodiment of the Invention: System Configuration of Signal Transmission System 100

Figure 5:
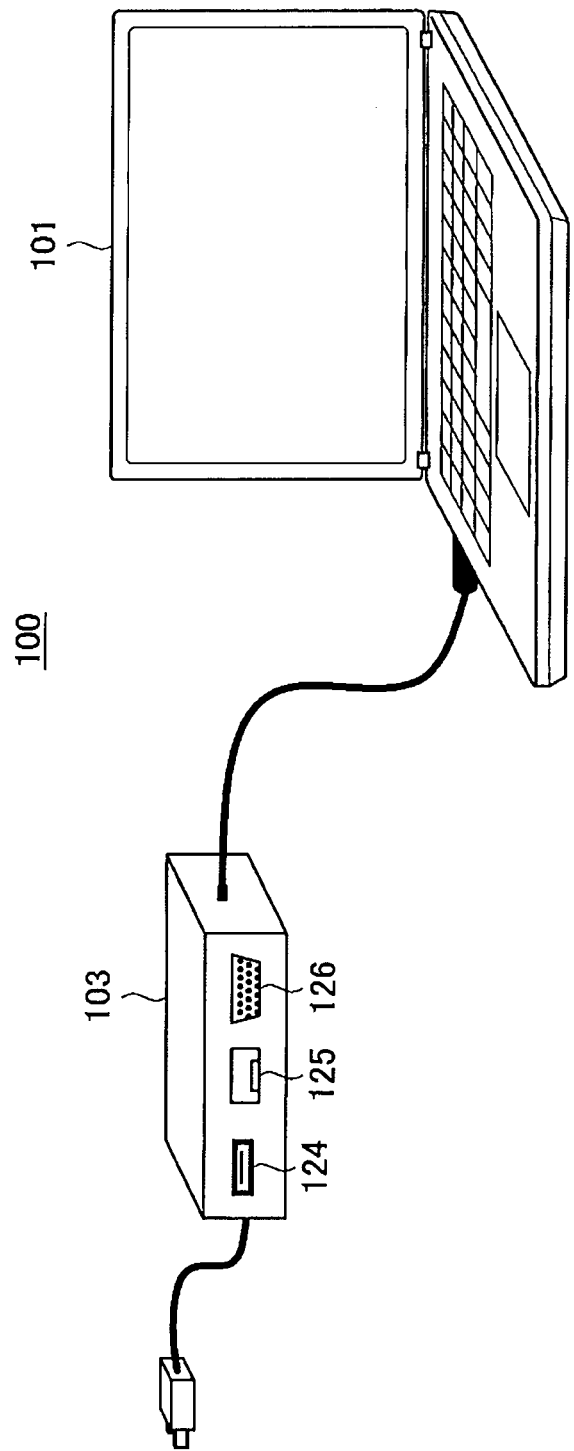
FIG. 5 is an explanatory view illustrating a signal transmission system according to a first embodiment of the invention.

A system configuration of a signal transmission system 100 according to a first embodiment of the invention will be described with reference to FIGS. 5 and 6. FIG. 5 is an explanatory view illustrating the signal transmission system 100 of the first embodiment. Although the notebook PC is schematically illustrated in FIG. 5 as an example of an information processing device 101 of the signal transmission system 100, an application range of the below-described technique is not limited to the notebook PC.

As illustrated in FIG. 5, the signal transmission system 100 includes an information processing device 101 and an interface device 103. The interface device 103 that is of the interface-equipped AC adapter produces the DC power from the AC power, the interface device 103 supplies part of the DC power to circuit operation thereof, and the interface device 103 supplies the rest to the information processing device 101. Various interfaces are incorporated in the interface device 103. As illustrated in FIG. 5, for example, a USB terminal 124, a LAN terminal 125, and a display terminal 126 are provided in the interface device 103. It is necessary that the interface device 103 and the information processing device 101 be connected to each other from the viewpoint of signal transmission. In the first embodiment, an interface data signal is superimposed on the DC power to provide a simple connection.

Figure 6:
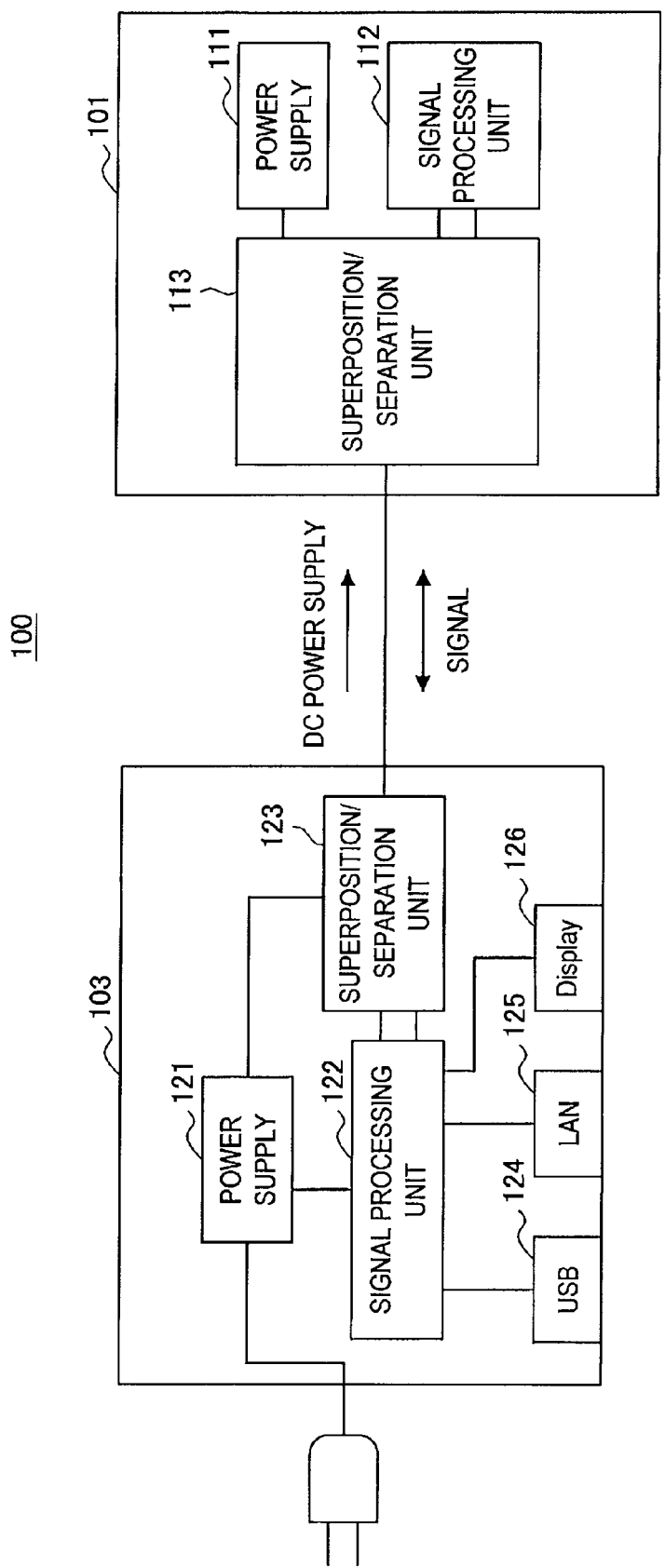
FIG. 6 is a functional configuration diagram illustrating the signal transmission system of the first embodiment.

FIG. 6 is a functional configuration diagram illustrating the signal transmission system 100 of the first embodiment. The interface device 103 and the information processing device 101 are connected by a pair of wiring lines. In order to reduce EMI, desirably the wiring lines are a coaxial wire having a shield structure or a twist pair line.

The information processing device 101 will be described below. The information processing device 101 includes a power supply circuit 111, a signal processing unit 112, and a superposition/separation unit 113. The superposition/separation unit 113 superimposes a signal of transmitted data on a direct current, and the superposition/separation unit 113 extracts a signal of received data. The signal processing unit 112 multiplexes the transmitted data from a processor and the like to various interfaces to perform the suitable coding in order to superimpose the transmitted data on the direct-current power, and the signal processing unit 112 supplies the coded data to the superposition/separation unit 113. The signal processing unit 112 decodes the received data, fed from the superposition/separation unit 113, into the multiplexed data in which pieces of data of the various interfaces are multiplexed, and the signal processing unit 112 separates the multiplexed data into the pieces of data of the various interfaces to supply the pieces of data of the various interfaces to the processor. The power supply circuit 111 is an internal power supply included in the information processing device 101.

Then the interface device 103 will be described. The interface device 103 includes a power supply circuit 121, a signal processing unit 122, a superposition/separation unit 123, and various interfaces (USB terminal 124, LAN terminal 125, and display terminal 126). The power supply circuit 121 produces the direct current from the alternating current. The produced direct current is supplied to the signal processing unit 122, the USB terminal 124, the LAN terminal 125, and the display terminal 126. The superposition/separation unit 123 supplies the direct current to the information processing device 101 through a cable while the direct current is superimposed on the data signal of the interface. The superposition/separation unit 123 superimposes the signal of the transmitted data on the direct current, and the superposition/separation unit 123 extracts the signal of the received data from the signal superimposed on the direct current. The signal processing unit 122 multiplexes the pieces of transmitted data from the various interfaces that are of the data input and output terminal, the signal processing unit 122 performs the coding of the multiplexed data in order to superimpose the multiplexed data on the direct current, and the signal processing unit 122 supplies the coded data to the superposition/separation unit 123. The signal processing unit 122 decodes the multiplexed data in which the pieces of data of the various interfaces from the received data fed from the superposition/separation unit 123. The signal processing unit 122 separates the multiplexed data into the pieces of data of the various interfaces, and the signal processing unit 122 supplies the pieces of data of the various interfaces to the interfaces.

2-2. Second Embodiment of the Invention: System Configuration of Signal Transmission System 200

Figure 7:
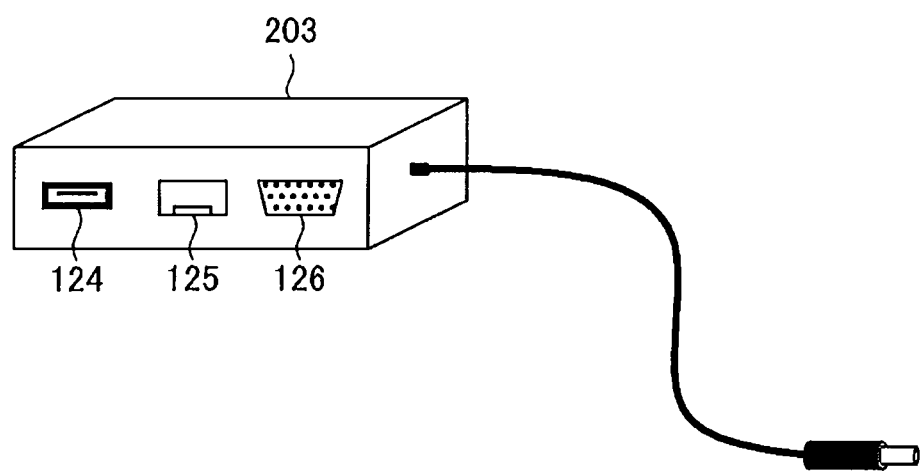
FIG. 7 is an explanatory view illustrating an interface device according to a second embodiment of the invention.
Figure 8:
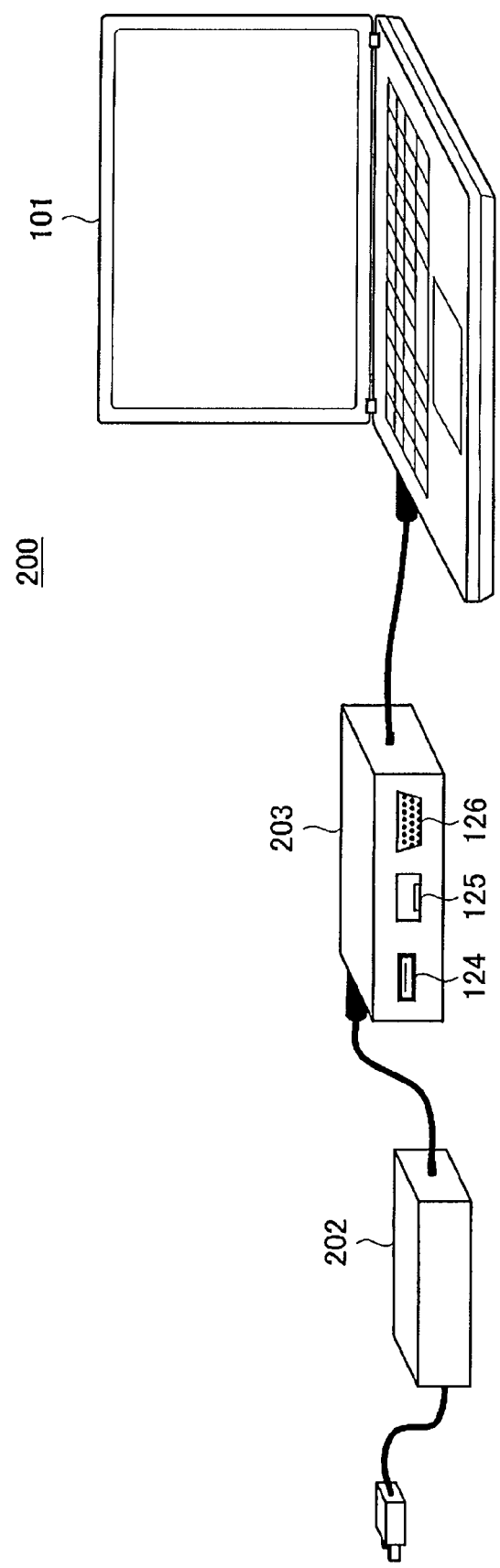
FIG. 8 is a functional configuration diagram illustrating the signal transmission system of the second embodiment.

A system configuration of a signal transmission system 200 according to a second embodiment of the invention will be described with reference to FIGS. 7 to 9. In the signal transmission system 200, as illustrated in FIG. 8, an interface device 203 is inserted between an AC adapter 202 and an information processing device 101. FIG. 7 is an explanatory view of the interface device 203. Various interfaces such as the USB terminal 124, the LAN terminal 125, and the display terminal 126 are incorporated in the interface device 203. The interface device 203 relays the direct current from the AC adapter 202 to the information processing device 101. The data signals of the various interfaces are superimposed between the interface device 203 and the information processing device 101, and the various interfaces can be used only by the simple connection to a direct-current power input of the information processing device 101.

FIG. 8 is an explanatory view illustrating a system configuration example of the signal transmission system 200 of the second embodiment. The component having the substantially same function as that of the signal transmission system 100 is designated by the same numeral, and the description is not repeated. In the signal transmission system 200 of the second embodiment, the interface device 203 is inserted between the AC adapter 202 and the information processing device 101 in order to extend the interface. A direct current input terminal of the interface device 203 has the same shape as the direct current input terminal of the information processing device 101. The data signals of the interfaces are superimposed on the direct current between the interface device 203 and the information processing device 101.

Figure 9:
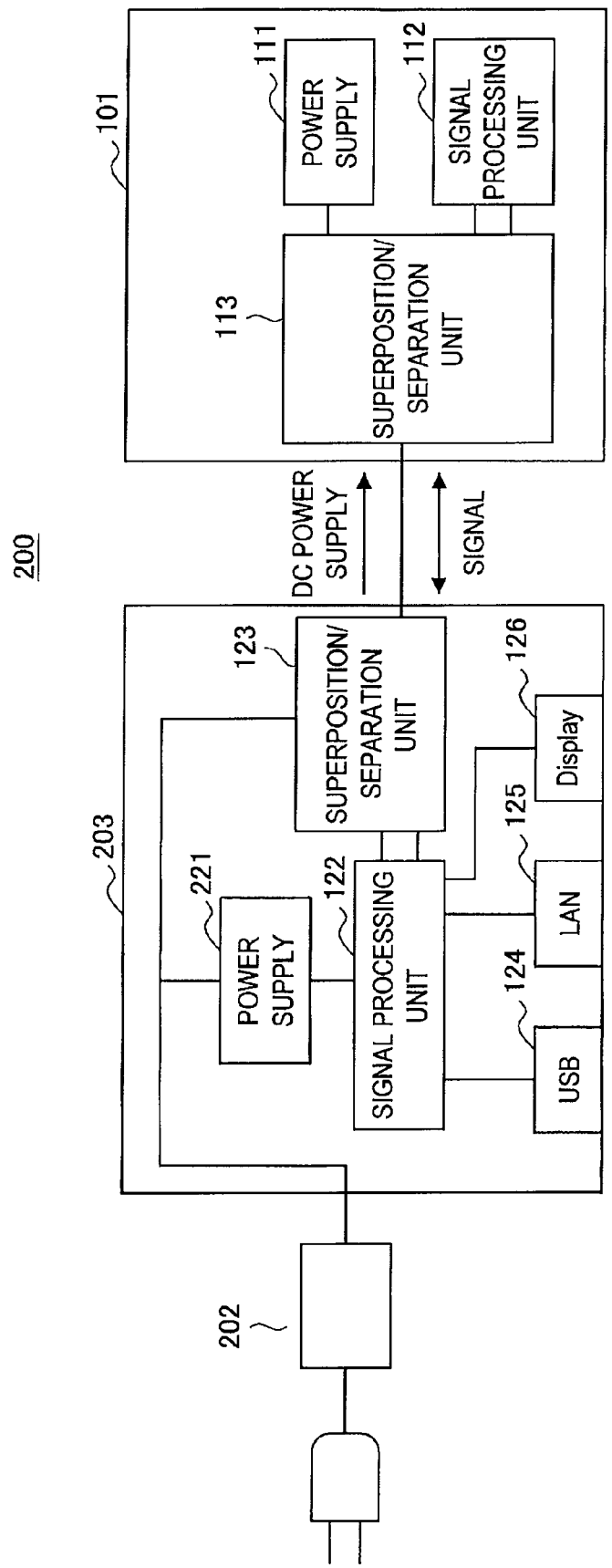
FIG. 9 is an explanatory view illustrating an interface device of the second embodiment.

FIG. 9 is a functional configuration diagram illustrating the signal transmission system 200 of the second embodiment. The component having the substantially same function as that of the signal transmission system 100 is designated by the same numeral, and the description is not repeated. The signal transmission system 200 includes the information processing device 101, the interface device 203, and the AC adapter 202. The interface device 203 includes a power supply circuit 221. In the signal transmission system 200 of the second embodiment, the interface device 203 is inserted between the AC adapter 202 and the information processing device 101 in order to extend the interface. The power supply circuit 221 produces the direct-current power necessary to circuits of the interface device 203 from the direct current supplied from the AC adapter 202. The produced direct-current power supply is supplied to the signal processing unit 122 and the various interface circuits. The direct current supplied from the AC adapter 202 is supplied to the superposition/separation unit 123, and the superposition/separation unit 123 superimposes the interface data signal on the direct current to supply the superimposed data to the information processing device 101 through a cable.

2-3. Third Embodiment of the Invention: System Configuration of Signal Transmission System 300

Figure 10:
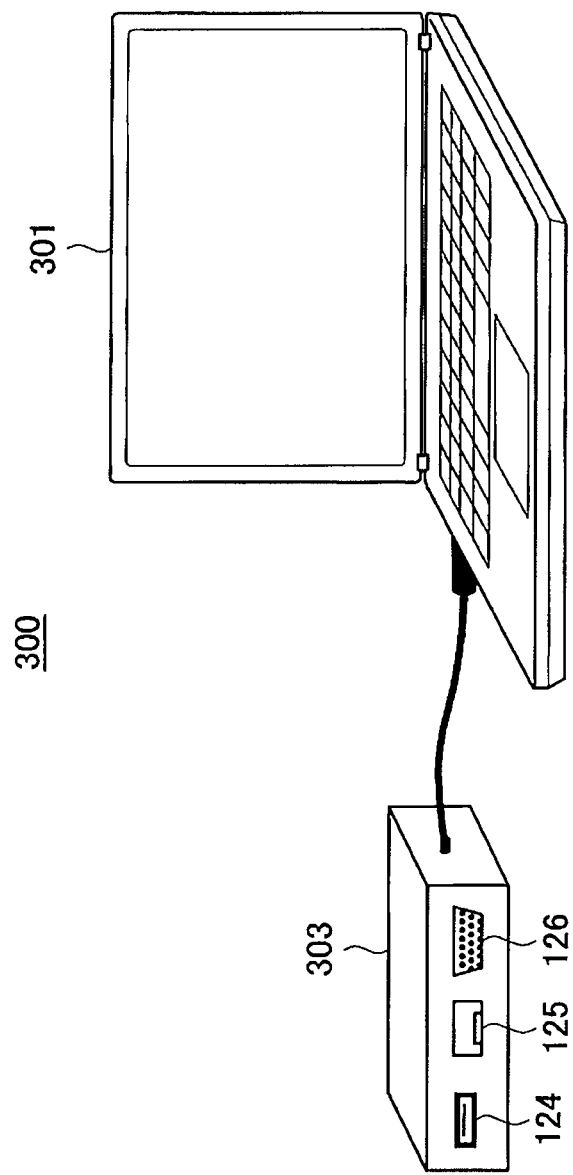
FIG. 10 is an explanatory view illustrating a signal transmission system according to a third embodiment of the invention.

A system configuration of a signal transmission system 300 according to a third embodiment of the invention will be described with reference to FIGS. 10 to 12. FIG. 10 is an explanatory view illustrating a system configuration example of the signal transmission system 300 of the third embodiment. In the signal transmission system 300 of the third embodiment, the AC adapter is removed from the configuration of the signal transmission system 200 of the second embodiment. Sometimes an information processing device 301 such as a notebook PC is operated by a battery without the use of the AC power. In such cases, it is necessary to supply the DC power from the information processing device 301 to an interface device 303.

Figure 11:
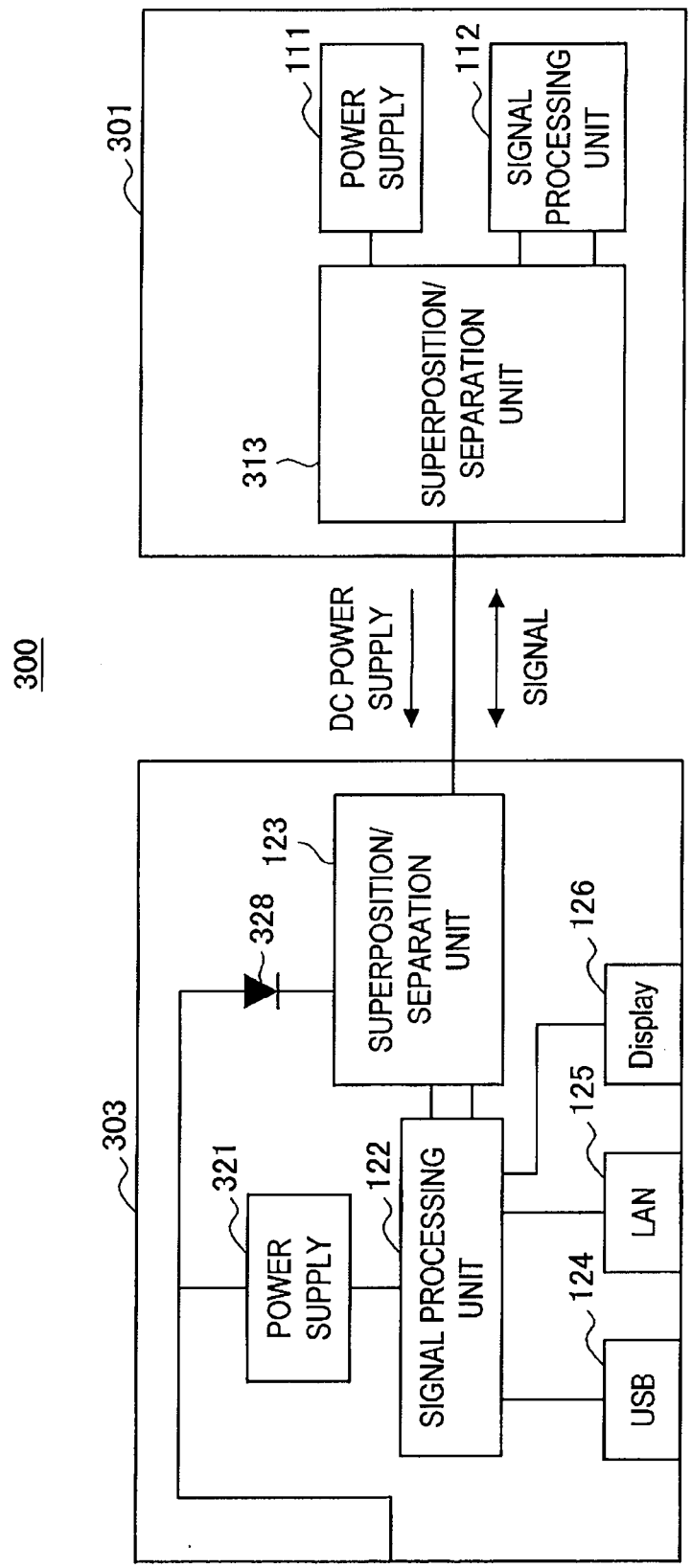
FIG. 11 is a functional configuration diagram illustrating the signal transmission system of the third embodiment.

FIG. 11 is a functional configuration diagram illustrating the signal transmission system 300 of the third embodiment. The component having the substantially same function as that of the signal transmission system 100 is designated by the same numeral, and the description is not repeated. The information processing device 301 includes a superposition/separation unit 313 and a diode 328. The interface device 303 includes a power supply circuit 321. The power supply circuit 321 receives the DC power from the information processing device 301 through the superposition/separation unit 123, and the power supply circuit 321 produces the power necessary for the interface device 303. The superposition/separation unit 313 superimposes the transmitted signal of the data on the direct-current power, and the superposition/separation unit 313 extracts the received signal of the data. The function exerted by the diode 328 included in the information processing device 301 is described in detail later with reference to FIG. 12. The signal processing unit 112 multiplexes the pieces of transmitted data of the various interfaces from the processor and the like, the signal processing unit 112 suitably performs the coding of the multiplexed data in order to superimpose the multiplexed data on the direct-current power, and the signal processing unit 112 supplies the superimposed data to the superposition/separation unit 313. The signal processing unit 112 decodes the signal multiplexed data in which the pieces of data of the various interfaces are multiplexed from the received data fed from the superposition/separation unit 313, the signal processing unit 112 separates the decoded data into the pieces of data of the various interfaces, and the signal processing unit 112 supplies the pieces of data of the various interfaces to the processor and the like.

In the configuration of the signal transmission system 300 of the third embodiment, as illustrated in FIG. 11, the direct-current power is supplied from the information processing device 301 to the interface device 303. In cases where the AC adapter is connected to the interface device 303 like the signal transmission system 200 of the second embodiment, the direct-current power is supplied to the interface device 303 and the information processing device 301. That is, in the information processing device 301, it is necessary to provide a mechanism corresponding to the supply or reception of the direct-current power because the direct-current power is supplied or received as occasion demands. The mechanism will be described with reference to FIG. 12.

Figure 12:
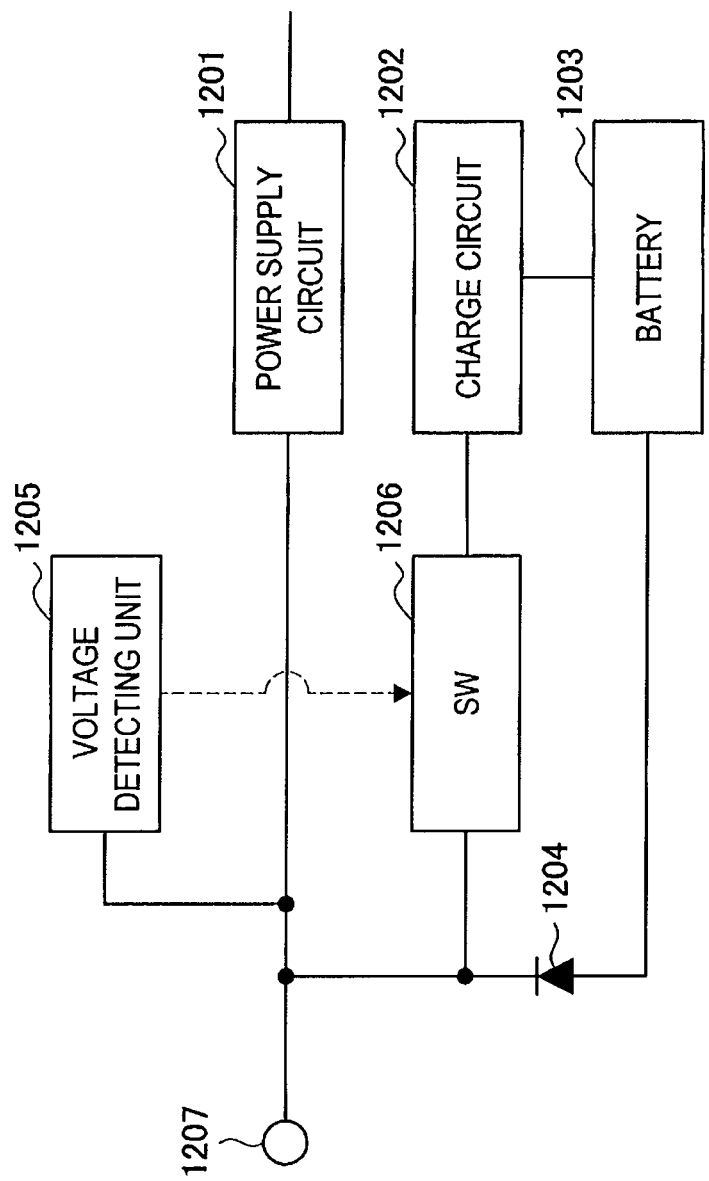
FIG. 12 is an explanatory view illustrating power supply state concerning an interface device of the third embodiment.

FIG. 12 is an explanatory view of a circuit for realizing a mechanism that controls a charge function of a secondary battery (battery) when the information processing device 301 supplies or receives the direct-current power. First, the case in which a voltage (high) of the DC power supplied from a power supply terminal 1207 is higher than an output voltage (low) of a battery 1203 of the information processing device 301 will be described. The direct-current power fed from the power supply terminal 1207 is supplied to a switch (SW) 1206, a voltage detecting circuit 1205 (voltage detection), and a power supply circuit 1201. The direct-current power is supplied to the power supply circuit 1201, and the power is supplied to circuits of the information processing device 301. The voltage detecting circuit 1205 detects the voltage (high) of the DC power. The voltage detecting circuit 1205 supplies a control signal meaning turn-on to the switch (SW) 1206. Therefore, the switch (SW) 1206 becomes the on state to supply the power to the charge circuit 1202. Because the output voltage of the battery 1203 is lower than that of the voltage at power supply terminal 1207, a diode 1204 becomes the off state to electrically disconnect the battery 1203 and the power supply terminal 1207.

Next, the case in which the direct-current power is supplied from the information processing device 301 will be described. The diode 1204 becomes the on state to electrically connect the battery 1203 and the power supply terminal 1207 because the power is not supplied from the power supply terminal 1207. The voltage detecting circuit 1205 detects the output voltage (low) of the battery 1203. The charge circuit 1202 is not operated because the voltage detecting circuit 1205 supplies a control signal meaning turn-off to the switch 1206. The direct-current power is supplied to the power supply circuit 1201 to supply the power to the circuits of the information processing device 301. The direct-current power is supplied from the power supply terminal 1207 to the outside (interface device 303).

2-4. Fourth Embodiment of the Invention: System Configuration of Signal Transmission System 400

Figure 13:
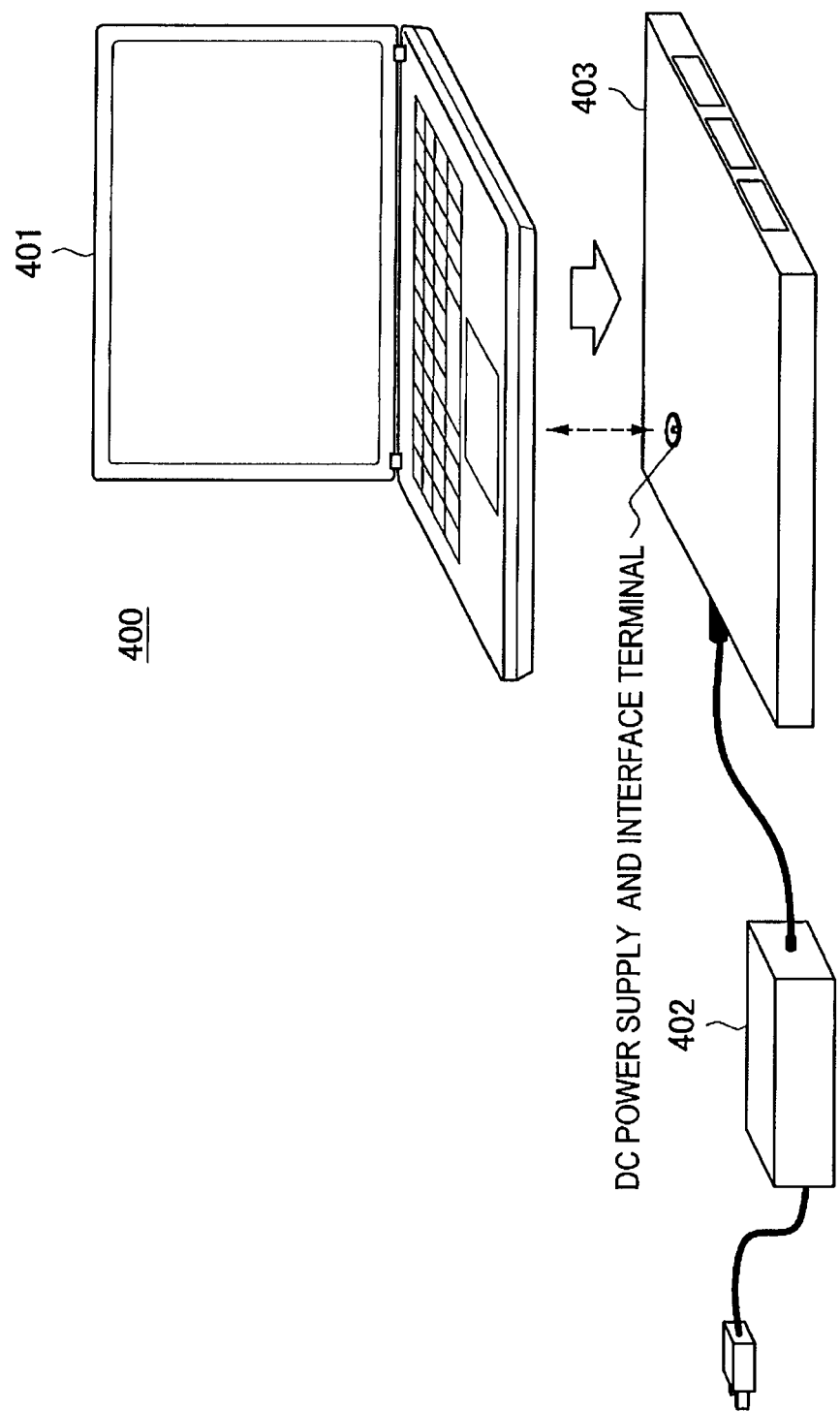
FIG. 13 is an explanatory view illustrating a signal transmission system according to a forth embodiment of the invention.
Figure 14:
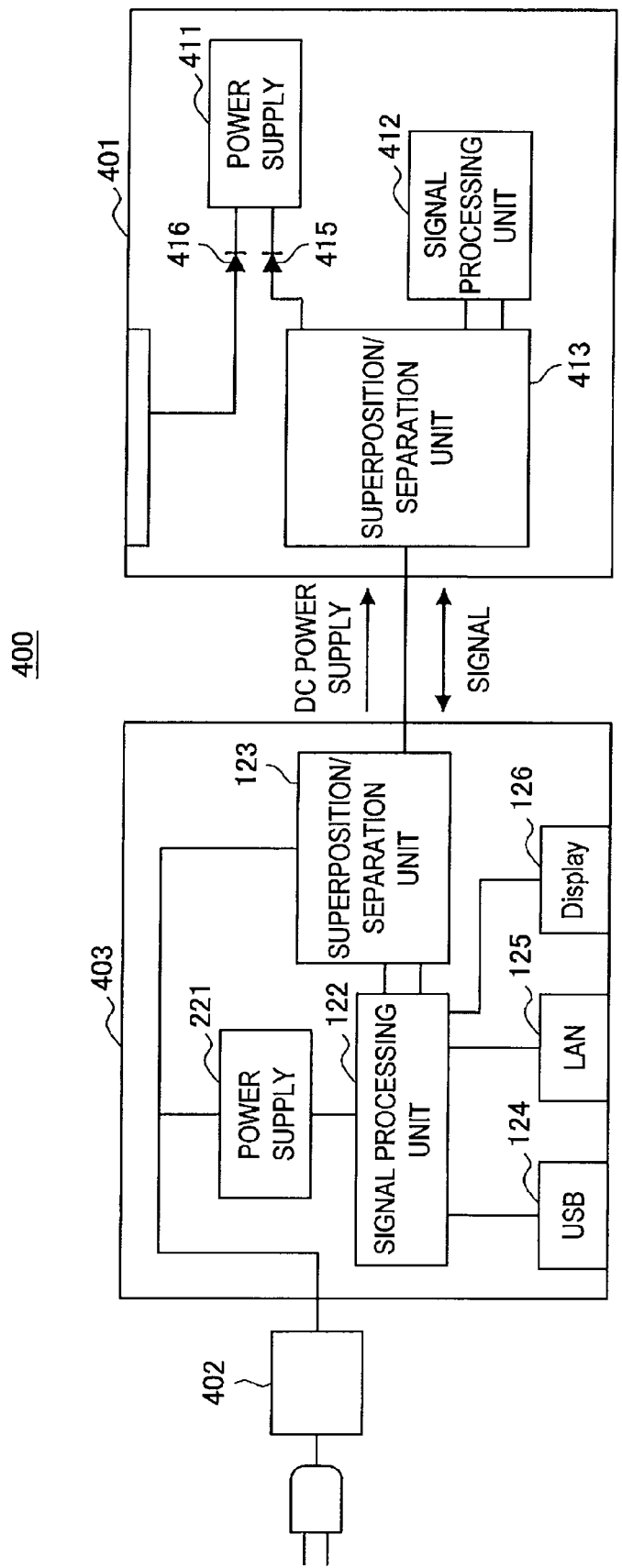
FIG. 14 is an explanatory view illustrating an interface device of the forth embodiment.

A system configuration of a signal transmission system 400 according to a fourth embodiment of the invention will be described with reference to FIGS. 13 and 14. FIG. 13 is an explanatory view illustrating a system configuration example of the signal transmission system 400 of the fourth embodiment. The signal transmission system 400 of the fourth embodiment includes an information processing device 401, an AC adapter 402, and a docking station 403. FIG. 14 is a functional configuration diagram illustrating the signal transmission system 400 of the fourth embodiment. The component having the substantially same function as that of the signal transmission system 100 is designated by the same numeral, and the description is not repeated. The docking station 403 is connected to the information processing device 401 through a direct-current power supply line on which the data signal of the interface is superimposed.

The signal transmission system 400 includes the information processing device 401, the docking station 403, and the AC adapter 402. The information processing device 401 includes a power supply circuit 411, a signal processing unit 412, and a superposition/separation unit 413. The docking station 403 includes a power supply circuit 221, a signal processing unit 122, a superposition/separation unit 123, and various interfaces (a USB terminal 124, a LAN terminal 125, and a display terminal 126).

The power supply circuit 221 produces the direct-current power from the AC power. The produced direct-current power supply is supplied to the signal processing unit 122 and the various interface circuits (the USB terminal 124, the LAN terminal 125, and the display terminal 126). The direct-current power is also supplied to the superposition/separation unit 123. The superposition/separation unit 123 superimposes the data signal of the interface on the direct-current power, and the superposition/separation unit 123 supplies the superimposed data to the information processing device 401 through the cable. The superposition/separation unit 123 superimposes the signal of the transmitted data on the direct-current power, and the superposition/separation unit 123 extracts the signal of the received data. The signal processing unit 122 multiplexes the pieces of transmitted data from the various interfaces, the signal processing unit 122 suitably performs the coding in order to superimpose the multiplexed data on the direct-current power, and the signal processing unit 122 supplies the coded data to the superposition/separation unit 123. The signal processing unit 122 decodes the multiplexed data in which the pieces of data of the various interfaces are multiplexed from the received data fed from the superposition/separation unit 123, the signal processing unit 122 separates the decoded data into the pieces of data of the various interfaces, and the signal processing unit 122 supplies the pieces of data to the interfaces.

The superposition/separation unit 413 of the information processing device 401 superimposes the signal of the transmitted data on the direct-current power, and superposition/separation unit 413 extracts the signal of the received data from the signal superimposed on the direct current. The signal processing unit 412 multiplexes the pieces of transmitted data of the various interfaces from the processor and the like, the signal processing unit 412 suitably performs the coding in order to superimpose the multiplexed data on the direct-current power, and the signal processing unit 412 supplies the coded data to the superposition/separation unit 413. The signal processing unit 412 decodes the multiplexed data in which the pieces of data of the various interfaces are multiplexed from the received data fed from the superposition/separation unit 413, the signal processing unit 412 separates the decoded data into the pieces of data of the various interfaces, and the signal processing unit 412 supplies the pieces of data to the processor and the like. The information processing device 401 can receive the direct-current power from both the direct-current power supply terminal connected to the AC adapter and the connecting terminal of the docking station. For example, diodes 415 and 416 are provided such that the direct-current power supply terminal and the connecting terminal do not interfere with each other, even when the information processing device 401 is connected to either the direct-current power supply terminal or the connecting terminal to supply the power to the information processing device 401.

2-5. Coding System

Figure 15:
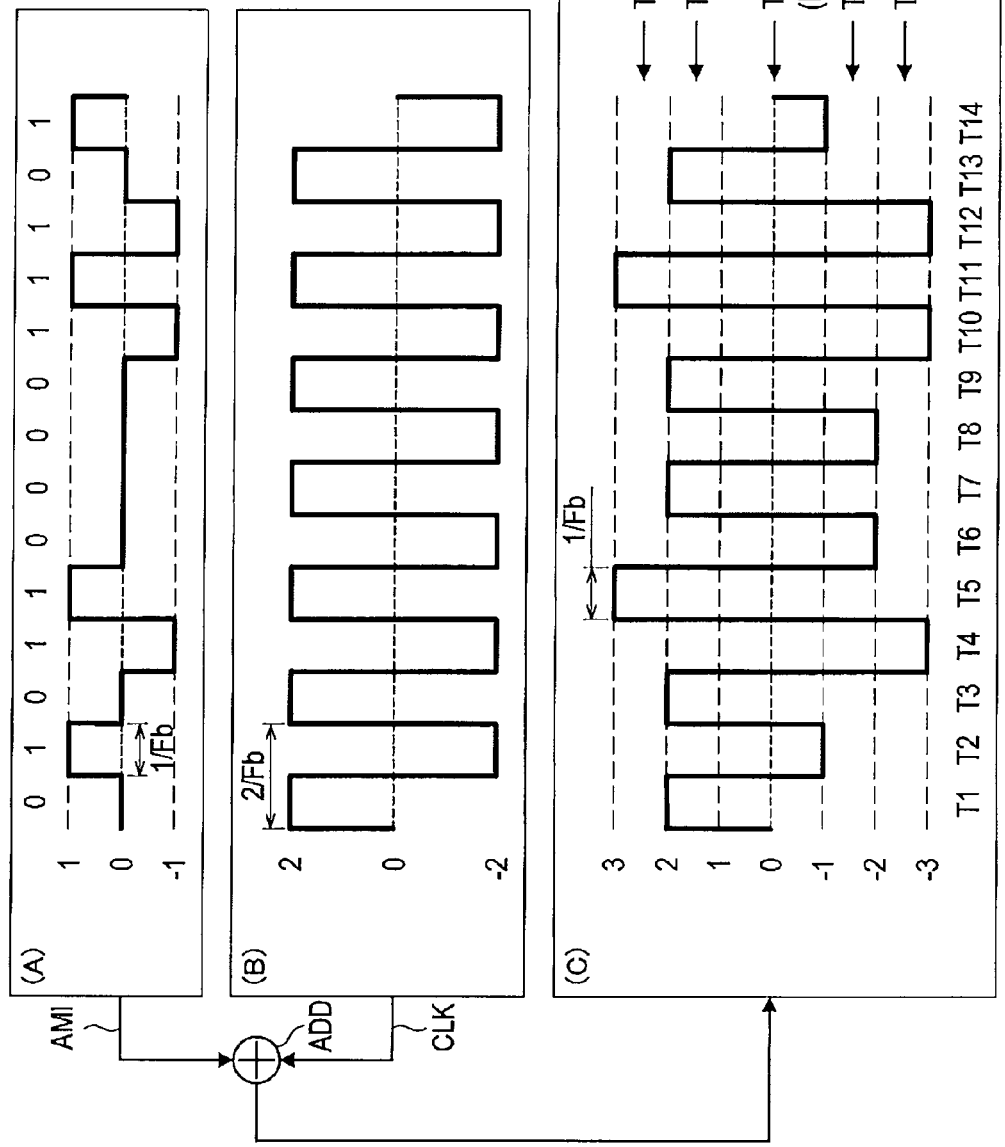
FIG. 15 is an explanatory view illustrating an example of a coding method in the signal transmission system of the fourth embodiment.
Figure 16:
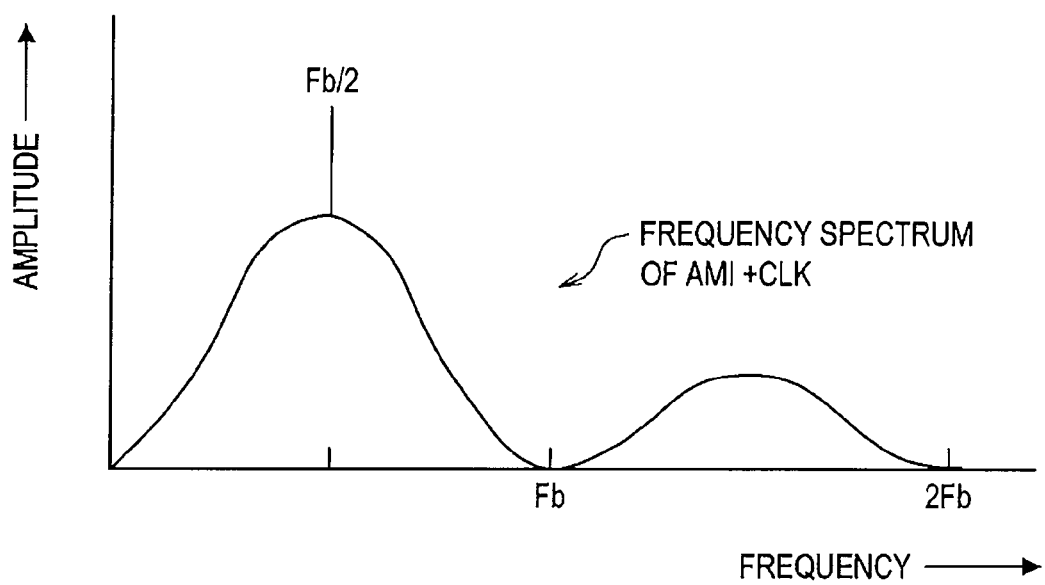
FIG. 16 is an explanatory view schematically illustrating a frequency spectrum of a code in the signal transmission system of the fourth embodiment.
Figure 17:
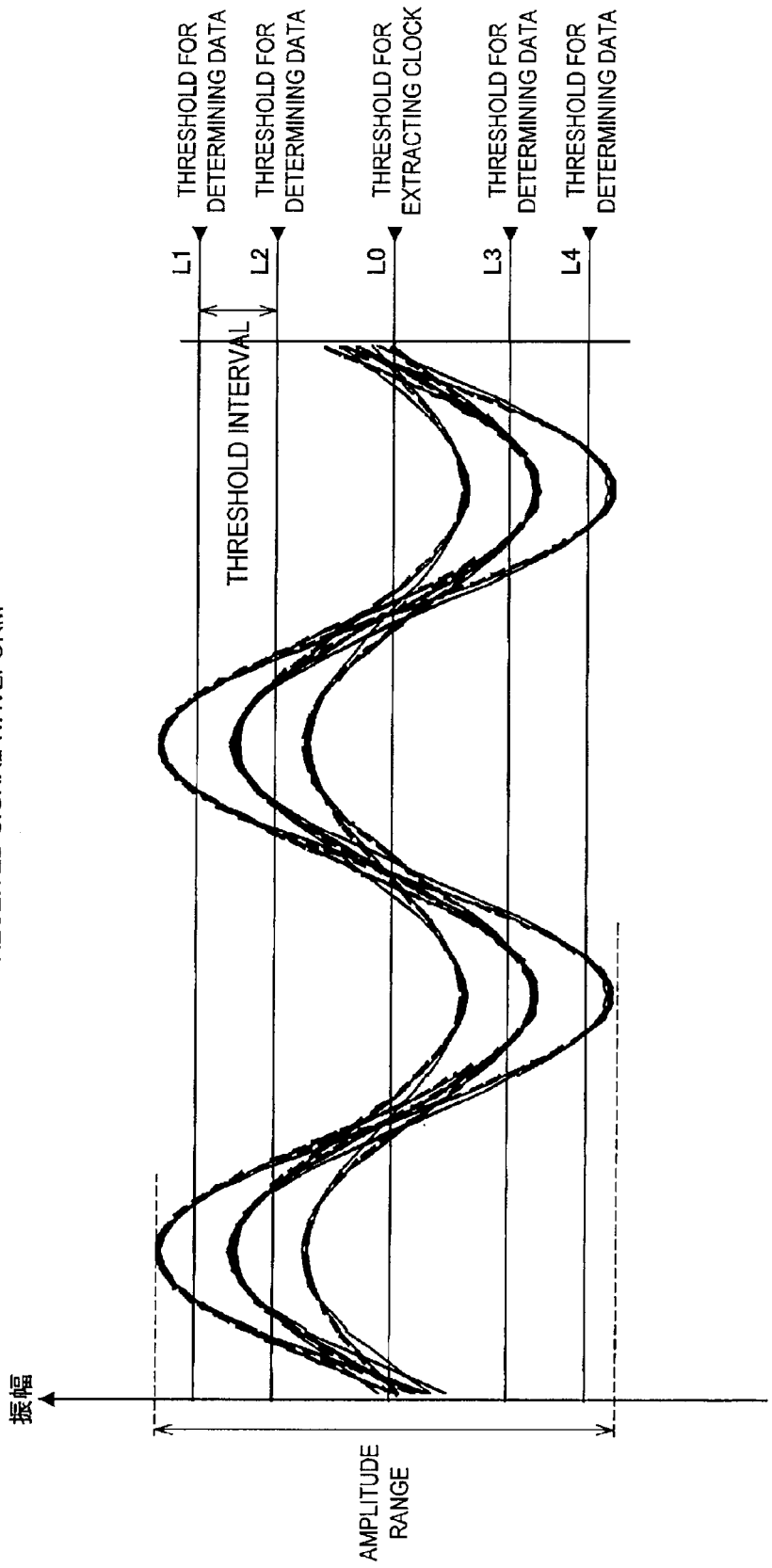
FIG. 17 is an explanatory view schematically illustrating a signal waveform in the signal transmission system of the fourth embodiment.

A coding system of the fourth embodiment will be described with reference to FIGS. 15 to 17. FIG. 15 is an explanatory view illustrating an example of a coding method and a code shape of the fourth embodiment. FIG. 16 is an explanatory view illustrating an example of a frequency spectrum of a code of the fourth embodiment. FIG. 17 is an explanatory view illustrating an example of a practical signal waveform that is observed in transmitting the code of the fourth embodiment. In the information processing device of the respective embodiment, the signal processing units 112 and 412 (hereinafter the description is made using the signal processing unit 112) code the transmitted data into the signal waveform.

Referring to FIG. 15, as described above, the signal processing unit 122 codes each divided data signal into a code shape. The code shape does not include the direct-current component, and a polarity of the code shape is inverted every half the period of the clock. In order to produce the code shape, the signal processing unit 122 codes each divided data signal into the code that does not include the direct-current component. For example, a Manchester code, an AMI code, a CMI code (Code Mark Inversion code), a bi-phase code such as AM modulation, a partial response code, and a bipolar phase code are used as the code that does not include the direct-current component. AMI stands for Alternate Mark Inversion. For example, in cases where the AMI code having a duty of 100% is used, a code (hereinafter referred to as code (A)) illustrated in FIG. 15A is produced.

In cases where data 1 is fed, the code (A) becomes a potential 1 or a potential −1 by toggle action. On the other hand, in cases where data 0 is fed, the code (A) becomes a potential 0. In FIG. 15, the code (A) has a transmission rate of Fb and a bit interval of 1/Fb. After the code (A) is produced, the signal processing unit 122 synchronously adds a clock (B)) to the code (A) using an adder ADD. As illustrated in FIG. 15, the clock (B) added to the code (A) has a frequency that is half the transmission rate of Fb of the code (A). Accordingly, the clock (B) has a period of 2/Fb. An amplitude of the clock (B) is set double the amplitude of the code (A). When the adder ADD adds the clock (B) to the code (A), a code (hereinafter referred to as code (C)) supplied from the adder ADD has a code shape illustrated in FIG. 15C. Although the amplitude of the clock (B) is set double the amplitude of the code (A), any amplitude of the clock (B) may be used as long as the amplitude of the clock (B) is larger than the amplitude of the code (A).

It is necessary that the code (A) and the clock (B) be synchronously added using the adder ADD while edges of the code (A) and clock (B) are matched with each other. Therefore, although the frequency of the clock (B) becomes half the transmission rate of Fb of the code (A), the clock (B) can be reproduced from the code (C) by detecting the rising and trailing edges of the code (C). As illustrated in FIG. 15, the code (C) has six amplitude values −3, −2, −1, 1, 2, and 3. Compared with the code (A), it is found that the data 0 corresponds to the amplitudes −2 and 2 of the code (C) while the data 1 corresponds to the amplitudes of the rest. Accordingly, the data can be decoded using the thresholds L1, L2, L3, and L4. The polarity inversion of the code (C) is detected using the threshold L0, so that the clock (B) can be reproduced based on the detected polarity inversion period.

Although the four thresholds L1, L2, L3, and L4 are necessary to distinguish between the data 1 and the data 0, the number of thresholds used to distinguish between the data 1 and the data 0 can be decreased to two when the code (C) is passed through an absolute value circuit to fold the negative amplitude values to the positive side. In addition to the method in which the absolute value is used, there are proposed various methods for decreasing the number of thresholds used to distinguish between the data 1 and the data 0. For example, the data 1 and the data 0 may be distinguished from each other after the clock (B) is subtracted from the code (C). Various modifications can be made with respect to the method of distinguishing between the data 1 and the data 0 from the code (C). As described above, the clock (B) can easily be detected from the code (C). Therefore, the use of PLL is eliminated on the reception side, thereby contributing to electric power saving. Further, the code (C) does not include the direct-current component, so that the code (C) can be transmitted while superimposed on the drive signal including the direct-current component.

Next, referring to FIGS. 16 and 17, FIG. 17 illustrates an example of an actually-measured eye pattern of the code (C). The code (C) has a rounded signal waveform because high frequency is cut off in transmitting the code (C). FIG. 16 illustrates a frequency spectrum of the code (C). A peak of the frequency spectrum appears at a position of the frequency of Fb/2. A line spectrum exists at the position of the frequency of Fb/2. In the frequency spectrum of FIG. 16, null points exist at the frequencies Fb, 2Fb, 3Fb, . . . . From the frequency spectrum of FIG. 16, it can also be confirmed that the code (C) does not include the direct-current component.

Thus, the use of the code that does not include the direct-current component can easily separate the code from the direct-current power, even if the code is transmitted while superimposed on the direct-current power as described above. The code is transmitted while the clock component is added thereto, the polarity inversion period of the received signal is detected, and the clock is reproduced based on the detection result, so that a circuit scale can be reduced because PLL is not provided on the signal reception side. This is significantly advantageous to devices such as the AC adapter, the docking station, and the interface BOX in which the miniaturization and low-profile are demanded.

2-6. Superposition Circuit

Figure 18:
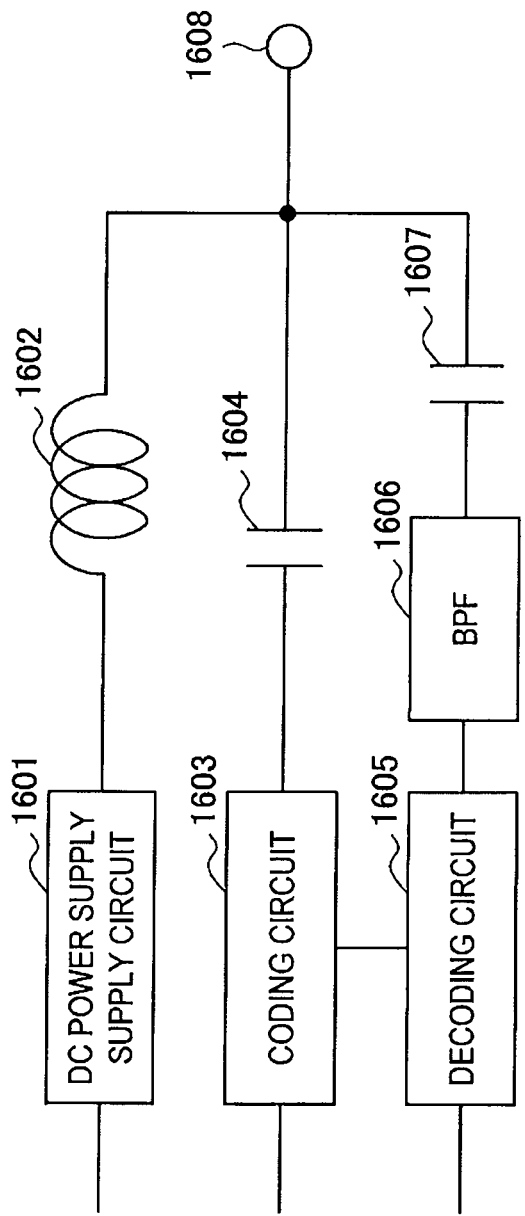
FIG. 18 is an explanatory view illustrating a superposition circuit in the signal transmission system of the fourth embodiment.

FIG. 18 is an explanatory view illustrating an example of the superposition circuit. An inductance (L) 1602 is connected to a direct-current power supply circuit 1601. A capacitor (C) 1604 is connected to a coding circuit 1603. A capacitor (C) 1607 is connected to a decoding circuit 1605 through BPF (Band Pass Filter) 1606. As illustrated in FIG. 18, terminals of the inductance (L) 1602, the capacitor (C) 1604, and the capacitor (C) 1607 are joined and connected to a connecting terminal 1608. Because the high-frequency component is not passed through the inductance (L) 1602, the inductance (L) 1602 prevents the data signal from invading into the power supply circuit, and the inductance (L) 1602 enhances impedance in a high-frequency band at the connecting terminal 1608. LPF (Low Pass Filter) is inserted between the direct-current power supply circuit 1601 and the inductance (L) 1602 if needed, which allows the enhancement of the data signal invasion preventing effect. On the other hand, the low-frequency component is not passed through the capacitors (C), so that the capacitors (C) can prevent an influence of the direct-current power on the data transmission and reception (coding circuit 1603 and decoding circuit 1605). BPF 1606 is a filter that reduces a noise of the frequencies except for the frequency band occupied by the data signal in order to enhance data reception and decoding capabilities.

2-7. Signal Processing Unit

FIG. 19 is a block diagram illustrating the signal processing unit 122 (or 412). It is assumed that three types of interfaces are provided. The signal processing unit 122 includes a data multiplexing unit 1901, a data separation unit 1902, and protocol conversion units 1910, 1920, and 1930 corresponding to various interfaces. The data multiplexing unit 1901 is a circuit that supplies serial data of the transmitted data fed from each interface while time-division multiplex of the transmitted data is performed. The data separation unit 1902 separates data in each interface from the time-division-multiplexed received data, and the data separation unit 1902 supplies the data as the serial data.

The protocol conversion unit 1910 includes a transmitted data conversion unit 1911 and a received data conversion unit 1912. The transmitted data conversion unit 1911 converts and serializes the pieces of transmitted data fed from the various interfaces for the purpose of the data superposition, and the transmitted data conversion unit 1911 supplies the data to the data multiplexing unit 1901. The received data conversion unit 1912 parallelizes the serial data fed from the data separation unit 1902 if needed, the received data conversion unit 1912 converts the parallel data into data suitable to the interface, and the received data conversion unit 1912 supplies the data to the interface circuit. In some interfaces, only the data is transmitted or only the data is received.

Similarly the protocol conversion unit 1920 includes a transmitted data conversion unit 1921 and a received data conversion unit 1922. The transmitted data conversion unit 1921 converts and serializes the pieces of transmitted data fed from the various interfaces for the purpose of the data superposition, and the transmitted data conversion unit 1921 supplies the data to the data multiplexing unit 1901. The received data conversion unit 1922 parallelizes the serial data fed from the data separation unit 1902 if needed, the received data conversion unit 1922 converts the parallel data into data suitable to the interface, and the received data conversion unit 1922 supplies the data to the interface circuit. In some interfaces, only the data is transmitted or only the data is received.

Similarly the protocol conversion unit 1930 includes a transmitted data conversion unit 1931 and a received data conversion unit 1932. The transmitted data conversion unit 1931 converts and serializes the pieces of transmitted data fed from the various interfaces for the purpose of the data superposition, and the transmitted data conversion unit 1931 supplies the data to the data multiplexing unit 1901. The received data conversion unit 1932 parallelizes the serial data fed from the data separation unit 1902 if needed, the received data conversion unit 1932 converts the parallel data into data suitable to the interface, and the received data conversion unit 1932 supplies the data to the interface circuit. In some interfaces, only the data is transmitted or only the data is received.

2-8. Summary

Finally the functional configuration of the information processing device of the embodiments and the effect obtained by the functional configuration are briefly summarized.

The functional configuration of the signal transmission system of the embodiments can be expressed as follows. The signal transmission system includes the information processing device and the interface device.

The information processing device includes the data coding unit that codes the first transmitted data into a waveform. In the waveform, the direct-current component is not included and the polarity is inverted in each half the period of the clock. As described above, the first transmitted data does not include the direct-current component, so that the first transmitted data can be transmitted while superimposed on the power signal supplied from the direct-current power supply. The first transmitted data includes the clock component whose polarity is inverted. Therefore, the clock can be reproduced without the use of PLL by detecting the polarity inversion period included in the first transmitted data. The information processing device includes the signal sending unit that sends the signal of the first transmitted data, produced by the coding processing of the data coding unit, to the interface device through the predetermined signal line while the signal of the first transmitted data is superimposed on the direct current. For example, the signal sending unit can send the first transmitted data to the interface device connected through one coaxial cable.

The information processing device includes the signal separation unit. The signal separation unit receives the signal of the second transmitted data on which the direct current is superimposed through the predetermined signal line, and the signal separation unit separates the received signal into the signal of the second transmitted data and the direct current. As described above, the second transmitted data is easily separated because the first transmitted data does not include the direct-current component.

The interface device includes the data input and output terminal, the signal separation unit, and the signal receiving unit. The data input and output terminal is used to supply and feed the data. The signal separation unit receives the signal of the first transmitted data on which the direct current is superimposed through the predetermined signal line, and the signal separation unit separates the received signal into the signal of the first transmitted data and the direct current. The signal receiving unit receives the signal of the first transmitted data. The interface device includes the data decoding unit. The data decoding unit decodes the first transmitted data using the clock reproduced by the clock reproducing unit, and the data decoding unit supplies the decoded first transmitted data to the data input and output terminal. The interface device includes the data coding unit. The data coding unit codes the second transmitted data, fed from the data input and output terminal, into the code shape that does not include the direct-current component using the clock reproduced by the clock reproducing unit.

The data coding unit codes the first transmitted data into the code. The code having the transmission rate of Fb does not include the direct-current component. In the code, the first bit value is expressed by the plural first amplitude values, and the second bit value is expressed by the second amplitude value that is different from the first amplitude value. Thus, the clock is synchronously added to the code that does not include the direct-current component, thereby producing the first data signal having the waveform. As a result, the second transmitted data signal can be transmitted while superimposed on the direct current, and the clock can be reproduced without the use of PLL in the interface device.

The data coding unit includes the signal sending unit that sends the signal of the second transmitted data, produced by the coding processing, through the predetermined signal line while the direct current is superimposed on the signal of the second transmitted data. The interface device includes the clock reproducing unit. The clock reproducing unit detects the polarity inversion period possessed by the signal of the first transmitted data received by the signal receiving unit, and the clock reproducing unit reproduces the clock based on the detection result. As described above, the polarity inversion period possessed by the signal of the first transmitted data is detected, which allows the clock to be easily reproduced based on the detection result. Therefore, the data decoding unit can decode the data except for the clock from the signal of the first transmitted data using the clock reproduced by the clock reproducing unit. In the above-described configuration, the number of signal lines used for the data transmission between the interface device and the information processing device can largely be decreased. The interface device can be incorporated in the AC adapter.

The information processing device may include the following component. The information processing device further includes the internal power supply and the voltage sensing unit. The internal power supply supplies the direct current. The output of the internal power supply (secondary battery) is connected to the power supply line through the diode, and the internal power supply can be used when the information processing device is used while the external power supply cannot be used.

The voltage sensing unit detects the voltage of the direct current separated by the signal separation unit. The signal sending unit stops the function of charging the internal secondary battery, when the voltage sensed by the voltage sensing unit is lower than a predetermined value. When the voltage is equal to or more than a predetermined value, a determination that the power is supplied from the outside is made to put the function of charging the secondary battery in the operated state.

The interface device may include the following component. The interface device may include the current supply terminal and the conversion circuit. The power supply terminal may supply the alternating current from the external power supply. The conversion circuit can convert the alternating current supplied to the current supply terminal into the direct current. The signal sending unit can send the signal of the second transmitted data while the signal of the second transmitted data is superimposed on the direct current supplied from the conversion circuit.

The interface device may include the following component. The interface device may include the current supply terminal. The direct current can be supplied to the current supply terminal. The signal sending unit can send the signal of the second transmitted data while the signal of the second transmitted data is superimposed on the direct current supplied from the current supply terminal. That is, the interface circuit can be incorporated in the AC adapter. Therefore, the inconvenience of the wiring line is eliminated in the information processing device such as a notebook PC.

The data coding unit codes the second transmitted data into the code shape selected from a group consisting of at least the AMI code, the CMI code, the partial response code, the Manchester code, and the bi-phase code including the AM modulation. When one of the codes is selected, the code does not include the direct-current component, so that the influence of the direct-current power can be avoided.

The interface device of the embodiments can be expressed as follow. The interface device includes the data input and output terminal, the superposition/separation unit, the signal receiving unit, the clock reproducing unit, the data decoding unit, the data coding unit, and the signal sending unit. The signal receiving unit receives the superimposed signal through the predetermined signal line. In the superimposed signal, the signal of the first transmitted data coded into the code shape and the direct current are superimposed on each other. The code shape does not include the direct-current component, and the polarity of the code shape is inverted every half the period of the clock. The signal sending unit sends the signal of the second transmitted data, produced by the coding processing of the data coding unit, through the predetermined signal line while the superposition/separation unit superimposes the signal of the second transmitted data on the direct current. That is, the interface device can supply and receive the power.

The signal transmission method performed by the signal transmission system is summarized as follows. First, the information processing device performs a data coding step, a superposition/separation step, and a signal sending step. In the data coding step, the first transmitted data is coded into the code shape. The code shape does not include the direct-current component, and the polarity of the code shape is inverted every half the period of the clock. In the signal sending step, the signal of the first transmitted data produced by the coding processing of the data coding method is sent to the interface device through the predetermined signal line. In the superposition/separation step, the signal of the first transmitted data produced by the coding processing of the data coding method is superimposed on the direct current, and the received signal is separated into the signal of the second transmitted data and the direct current.

The interface device performs an input and output step, a signal receiving step, a clock reproducing step, a data decoding step, a data coding step, and a signal sending step. In the input and output step, the data is supplied and fed through the data input and output terminal used to supply and feed the data. In the signal receiving step, the signal on which the direct current is superimposed is received through the predetermined signal line, and the signal of the first transmitted data is received from the received signal. In the clock reproducing step, the polarity inversion period possessed by the signal of the first transmitted data received in the signal receiving step is detected, and the clock is reproduced based on the detection result. In the data decoding step, the first transmitted data is decoded using the clock reproduced in the clock reproducing step, and the decoded first transmitted data is supplied to the data input and output terminal. In the data coding step, the second transmitted data fed from the data input and output terminal is coded into the code shape that does not include the direct-current component using the clock reproduced in the clock reproducing step. In the signal sending step, the direct current is superimposed on the second transmitted data produced by the coding processing in the data coding step, and the superimposed data is sent through the predetermined signal line. The interface device can be incorporated in the AC adapter by the use of the signal transmission method.

The following signal transmission method performed by the signal transmission system is also summarized as follows. The interface device performs a signal receiving step, a signal separation step, a clock reproducing step, a data decoding step, a data coding step, and a signal sending step. Particularly, in the signal receiving step, the superimposed signal is received through the predetermined signal line. In the superimposed signal, the signal of first transmitted data coded into the code shape and the direct current are superimposed on each other. The code shape does not include the direct-current component, and the polarity of the code shape is inverted every half the period of the clock. In the signal sending step, the signal of the second transmitted data produced by the coding processing in the data coding step is superimposed on the direct current, and the superimposed data is sent through the predetermined signal line. In the signal transmission method, the power can be supplied to and received from the interface device.

As described above, in the signal transmission system in which the interface of the embodiments is used, the interface device is incorporated in the AC adapter, and it is not necessary to provide the terminal dedicated to the interface device in PC. The interface-equipped AC adapter and PC can be connected by the simple connecting cable similar to that of the DC power supply cable, and the interface device and the information processing device can also be connected by the simple connecting cable.

(Remarks)

The signal processing unit 122 is an example of the data coding unit, the clock reproducing unit, and the data decoding unit. The superposition/separation units 113, 123, 313, 123, and 413 are examples of the signal superposition/separation unit. The signal processing units 112 and 412 are examples of the data coding unit.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-301445 filed in the Japan Patent Office on Nov. 26, 2008, the entire content of which is hereby incorporated by reference.

What is claimed is:

1. The signal transmission system comprising an information processing device and an interface device, wherein the information processing device includes:

a data coding unit that codes data into first transmitted data, the first transmitted data not including a direct-current component;

a signal sending unit that superimposes a signal of the first transmitted data produced by the data coding unit on a direct current and sends the superimposed signal to the interface device through a predetermined signal line; and a signal separation unit that receives a signal of second transmitted data on which the direct current is superimposed through the predetermined signal line and separates the received signal into the signal of the second transmitted data and the direct current, and the interface device includes:

a data input and output terminal that is used to supply and feed the data;

a signal separation unit that receives the signal of the first transmitted data on which the direct current is superimposed through the predetermined signal line and separates the received signal into the signal of the first transmitted data and the direct current;

a signal receiving unit that receives the signal of the first transmitted data;

a clock reproducing unit that reproduces a clock from the signal of the first transmitted data received by the signal receiving unit;

a data decoding unit that decodes the first transmitted data using the clock reproduced by the clock reproducing unit and supplies the decoded first transmitted data to the data input and output terminal;

a data coding unit that codes the second transmitted data into a code shape that does not include a direct-current component using the clock reproduced by the clock reproducing unit, the second transmitted data being fed from the data input and output terminal; and a signal sending unit that superimposes the signal of the second transmitted data produced by the data coding unit on the direct current and sends the superimposed data through the predetermined signal line, wherein the information processing device further includes:

an internal secondary battery that supplies the direct current; and a voltage sensing unit that senses a voltage of the direct current separated by the signal separation unit, wherein the signal sending unit stops a charge circuit that charges the internal secondary battery when the voltage sensed by the voltage sensing unit is equal to or lower than a predetermined value.

2. The signal transmission system according to claim 1, wherein the data coding unit of the information processing device codes the transmitted data into a code shape whose polarity is inverted every half a period of the clock.

3. The signal transmission system according to claim 2, wherein the clock reproducing unit detects a polarity inversion period of the data signal, and the clock reproducing unit reproduces the clock based on the detection result.

4. The signal transmission system according to claim 1, wherein the information processing device is operated using the direct current when the direct current is supplied from the interface, the information processing device is operated using the direct current supplied from the internal secondary battery when the direct current is not supplied from the interface, and the information processing device superimposes the transmitted data on the direct current supplied from the secondary battery.

5. The signal transmission system according to claim 1, wherein the interface device is operated using the direct current when the information processing device supplies the direct current.

6. An information processing device comprising:

a data coding unit that codes data into first transmitted data, the first transmitted data not including a direct-current component;

a signal sending unit that superimposes a signal of the first transmitted data produced by the data coding unit on a direct current and sends the superimposed signal to the interface device through a predetermined signal line;

a signal separation unit that receives a signal of second transmitted data on which the direct current is superimposed through the predetermined signal line and separates the received signal into the signal of the second transmitted data and the direct current;

an internal secondary battery that supplies the direct current; and a voltage sensing unit that senses a voltage of the direct current separated by the signal separation unit, wherein the signal sending unit stops a charge circuit that charges the internal secondary battery when the voltage sensed by the voltage sensing unit is equal to or lower than a predetermined value.

7. The information processing device according to claim 6, wherein the data coding unit codes the transmitted data into a code shape whose polarity is inverted every half a period of the clock.

\* \* \* \* \*